US009462356B2

(12) United States Patent
Takeuchi et al.

(10) Patent No.: US 9,462,356 B2
(45) Date of Patent: Oct. 4, 2016

(54) PATCH PANEL ASSEMBLY

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 211 days.

(21) Appl. No.: 14/283,618

(22) Filed: May 21, 2014

(65) Prior Publication Data
US 2014/0355217 A1 Dec. 4, 2014

Related U.S. Application Data

(60) Provisional application No. 61/828,358, filed on May 29, 2013.

(51) Int. Cl.
H05K 7/16 (2006.01)
H04Q 1/06 (2006.01)
H04Q 1/02 (2006.01)

(52) U.S. Cl.
CPC . H04Q 1/06 (2013.01); H04Q 1/13 (2013.01)

(58) Field of Classification Search
CPC .... G06F 1/1633; H05K 7/14; H05K 7/1401; H05K 7/1421; H05K 7/1427; H05K 7/1461; H05K 7/186; G02B 6/4452–6/4455; G02B 6/3897; H04Q 1/13; H04Q 1/06
USPC ......... 361/679.01, 679.37–679.39, 724–727; 312/223.1–223.3; 385/15, 135
See application file for complete search history.

(56) References Cited

U.S. PATENT DOCUMENTS

| 2,865,979 | A | 12/1958 | Klassen |
| 4,353,518 | A | 10/1982 | Taylor et al. |
| 4,688,885 | A | 8/1987 | Poteat et al. |
| 5,100,221 | A | 3/1992 | Carney et al. |
| 5,613,021 | A | 3/1997 | Saito et al. |

(Continued)

FOREIGN PATENT DOCUMENTS

| EP | 0207926 A2 | 1/1987 |
| EP | 0795935 A2 | 9/1997 |

OTHER PUBLICATIONS

International Search Report and Written Opinion for Application No. PCT/US2013/033701 dated Sep. 2, 2013.

(Continued)

Primary Examiner — Hoa C Nguyen
Assistant Examiner — Sagar Shrestha
(74) Attorney, Agent, or Firm — Lerner, David, Littenberg, Krumholz & Mentlik, LLP

(57) ABSTRACT

A device and a system may facilitate access to communication connectors, adapters, and/or ports that are supported within a housing, e.g., a rack or cabinet. The system may include a tray slidable distally into a housing and proximally out of the housing. A plurality of first connectors may each be coupled to an arm having a distal end pivotably coupled to the tray. The tray may include a track, and a connector holder may be slidably coupled to the track. At least one second connector may be coupled to the connector holder and may have a stored state and a retracted state and may be positioned at least partially distal to the distal ends of the arms when in the stored state.

20 Claims, 24 Drawing Sheets

(56) References Cited

U.S. PATENT DOCUMENTS

| | | | |
|---|---|---|---|
| 5,775,755 A | 7/1998 | Covert et al. | |
| 6,070,742 A | 6/2000 | McAnally et al. | |
| 6,263,141 B1 | 7/2001 | Smith | |
| 6,293,707 B1 | 9/2001 | Wild | |
| 6,327,139 B1 | 12/2001 | Champion et al. | |
| 6,356,697 B1 | 3/2002 | Braga et al. | |
| 6,442,030 B1 | 8/2002 | Mammoser et al. | |
| 6,556,763 B1* | 4/2003 | Puetz | G02B 6/4452 385/134 |
| 6,902,069 B2 | 6/2005 | Hartman et al. | |
| 6,925,241 B2 | 8/2005 | Bohle et al. | |
| 7,335,056 B1 | 2/2008 | Clark et al. | |
| 7,352,945 B2 | 4/2008 | Holmberg et al. | |
| 7,460,758 B2 | 12/2008 | Xin | |
| 7,746,667 B1 | 6/2010 | Baiza et al. | |
| 8,068,715 B2 | 11/2011 | Kewitsch | |
| 8,175,425 B2 | 5/2012 | Chen | |
| 8,179,684 B2* | 5/2012 | Smrha | H04Q 1/142 312/223.2 |
| 8,731,361 B2 | 5/2014 | Anderson et al. | |
| 8,939,792 B2 | 1/2015 | Takeuchi et al. | |
| 2002/0117942 A1 | 8/2002 | Audibert et al. | |
| 2004/0074852 A1 | 4/2004 | Knudsen et al. | |
| 2004/0178312 A1 | 9/2004 | Parsons | |
| 2005/0111809 A1* | 5/2005 | Giraud | G02B 6/4455 385/135 |
| 2006/0018622 A1* | 1/2006 | Caveney | G02B 6/4455 385/135 |
| 2006/0162948 A1 | 7/2006 | Rinderer et al. | |
| 2007/0096606 A1 | 5/2007 | Ryu | |
| 2007/0189692 A1* | 8/2007 | Zimmel | G02B 6/4452 385/135 |
| 2007/0230889 A1 | 10/2007 | Sato et al. | |
| 2008/0002937 A1 | 1/2008 | Spisany et al. | |
| 2008/0205843 A1* | 8/2008 | Castonguay | G02B 6/3897 385/135 |
| 2009/0078834 A1 | 3/2009 | Chen et al. | |
| 2009/0086441 A1 | 4/2009 | Randall et al. | |
| 2009/0238533 A1 | 9/2009 | Stansbury et al. | |
| 2010/0008623 A2 | 1/2010 | Arol et al. | |
| 2010/0054659 A1 | 3/2010 | Pnini et al. | |
| 2010/0310221 A1 | 12/2010 | Le Dissez | |
| 2010/0310225 A1* | 12/2010 | Anderson | G02B 6/4455 385/135 |
| 2011/0267794 A1* | 11/2011 | Anderson | G02B 6/4452 361/810 |
| 2011/0317971 A1 | 12/2011 | Zhang et al. | |
| 2012/0019117 A1 | 1/2012 | Dunwoody et al. | |
| 2012/0321255 A1 | 12/2012 | Kewitsch | |
| 2013/0196538 A1 | 8/2013 | Takeuchi et al. | |
| 2014/0248028 A1 | 9/2014 | Campbell et al. | |
| 2014/0262487 A1 | 9/2014 | Takeuchi et al. | |
| 2014/0348481 A1* | 11/2014 | Giraud | G02B 6/3825 385/135 |
| 2014/0354131 A1 | 12/2014 | Takeuchi et al. | |
| 2014/0355217 A1 | 12/2014 | Takeuchi et al. | |
| 2014/0357118 A1 | 12/2014 | Takeuchi et al. | |
| 2015/0253529 A1 | 9/2015 | Lu et al. | |
| 2015/0268436 A1* | 9/2015 | Blackwell, Jr. | G02B 6/3897 385/135 |
| 2015/0301298 A1 | 10/2015 | Frith et al. | |
| 2016/0047999 A1 | 2/2016 | Alexi et al. | |

OTHER PUBLICATIONS

International Search Report and Written Opinion for Application No. PCT/US2014/021953 dated Jun. 25, 2014.
International Search Report for Application No. PCT/US2013/023176 dated Jun. 27, 2013.
Partial International Search Report for Application No. PCT/US2013/023176 dated May 2, 2013.
Partial International Search Report for Application No. PCT/US2013/033701 dated Jul. 11, 2013.

\* cited by examiner

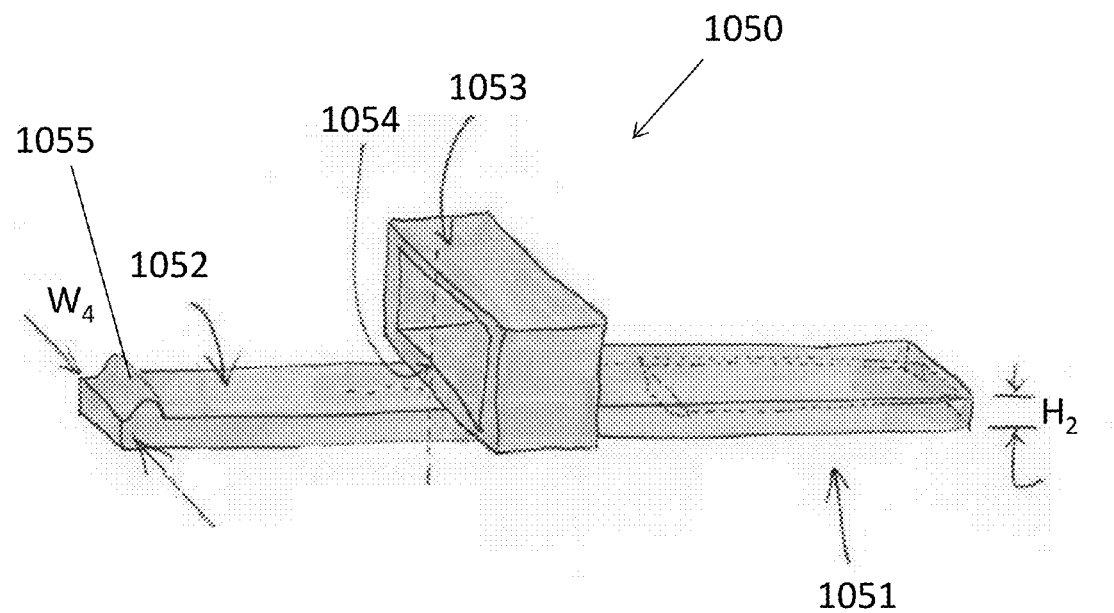
FIG. 14B
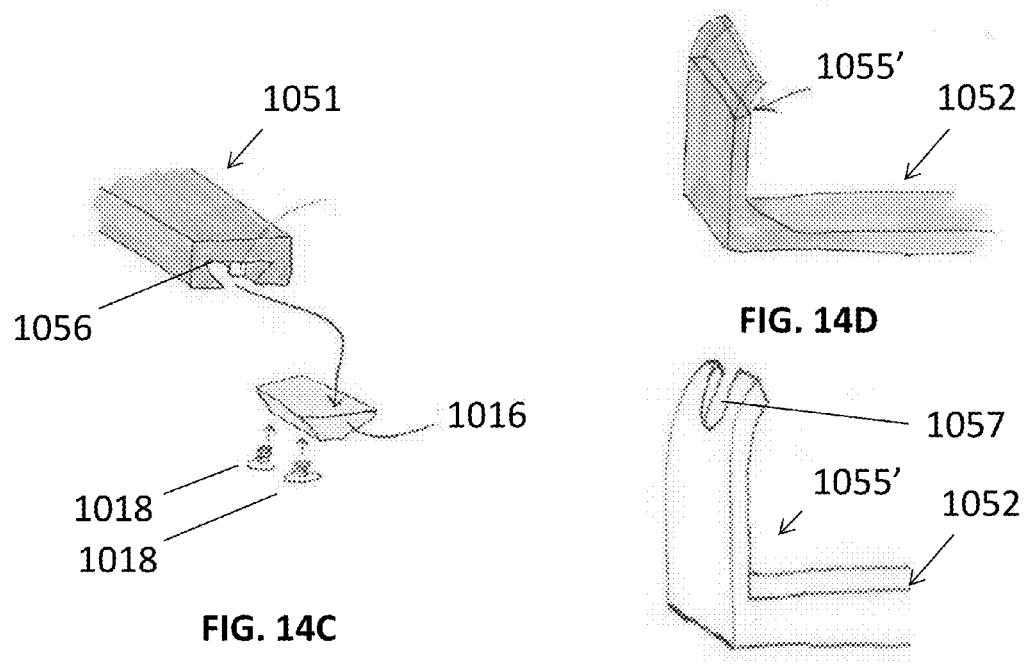
FIG. 14C
FIG. 14D
FIG. 14E

PATCH PANEL ASSEMBLY

CROSS-REFERENCE TO RELATED APPLICATIONS

The present application claims the benefit of the filing date of U.S. Provisional Patent Application No. 61/828,358 filed May 29, 2013, the disclosure of which is hereby incorporated by reference herein.

BACKGROUND OF THE DISCLOSURE

The present disclosure generally relates to devices and systems for supporting and managing communication connectors, adapters, and/or ports. More particularly, the present disclosure relates to communication patch panel devices and systems, which facilitate access to communication connectors, adapters, and/or ports supported by the devices and systems.

In communications cabinets and racks, a multitude of cables are interconnected to one another through connectors, e.g., adapters. A cable organization unit typically has a tray or a shelf or a similar platform, which supports the connectors, e.g., adapters. Examples of cable organization units include patch panels.

A patch panel houses cable connectors and in the majority of cases is rack mounted. The patch panel typically is two-sided; the front of the patch panel provides for connections to relatively short wires or cables, and the rear of the patch panel usually provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be part of longer cables. The patch panel facilitates interconnecting, monitoring, and circuit testing of equipment without necessitating costly switching equipment.

Early applications for patch panels were for telephone exchanges, where they are still used albeit in a more automated form. Patch panels are also used extensively in the entertainment industry, e.g., in recording and television studios. They are also used in concert halls to manage connections among equipment, e.g., microphones, speakers, and other electronic equipment. Patch panels are valued for such purposes not only for their convenience and relative cost effectiveness, but also because they make it easier to identify problems such as feedback, ground loops, and static.

Traditional fiber optic cable organization units include fiber optic shelves having a single patch panel or multiple modular panels on the front patching side of the shelf. It is desirable to provide patch panels having increased connector port density, i.e., the number of locations or ports per unit volume of area for providing connections. To this end, smaller sized connectors are increasingly being utilized.

A variety of optical fiber connectors are available, with the Subscriber Connector (SC) and the Lucent Connector (LC) being the most common. The differences among the types of connectors include dimensions and methods of mechanical coupling. For instance, SC connectors use a round 2.5 mm ferrule to hold a single fiber and use a push-on/pull-off mating mechanism. The ferrule of an LC connector is half the size as that of an SC connector, measuring only 1.25 mm. LC connectors use a retaining tab mechanism, which is similar to that found on a household phone connector.

In data communication and telecommunication applications, small connectors, e.g., LC, are increasingly replacing traditional connectors, e.g., SC. The main advantage of small connectors over larger sized connectors is the ability to provide a higher number of fibers per unit of rack space. Since the LC connector is roughly half the size as the SC connector, the placement of almost twice the number of connectors is possible within the same amount of space by using the LC connector instead of the SC connector.

However, there are disadvantages associated with using smaller connectors. As more connectors are placed within the same amount of space, accessing the connectors which is often performed by hand may present a challenge. Adult fingers typically have a diameter of 16 mm to 20 mm. Some people may have larger or misshapen fingers. Therefore, the use of small connectors, such as the LC having a 1.25 mm diameter ferrule, may be especially problematic for technicians having larger or less dexterous hands. Commonly, LC connectors are held together in a duplex configuration with a plastic clip. While holding smaller sized connectors in a duplex configuration may make it easier for a technician to access and/or remove LC connectors, it also means that two connectors are necessarily affected by any given servicing procedure.

There is a continuing need for new devices and systems to facilitate access communication adapters and/or cables supported by communication patching devices and systems.

BRIEF SUMMARY

The present disclosure is generally related to communication patch panels and communication patching systems. In particular, the present disclosure is related to patch panels that facilitate both the placement of multiple, relatively small connectors in close proximity to each other and the manipulation and/or maintenance of those connectors.

In one embodiment of the disclosure, a communication patch panel device includes a first tray portion having substantially parallel first and second sides, a distal side extending from the first side to the second side, and a proximal side extending from the first side to the second side. The distal side may be substantially orthogonal to the first and second sides and may have a first length. The patch panel device may also include a connection means including a first plurality of ports extending along the proximal side. The connection means in a non-expanded state may have a second length greater than the first length. The connection means in the non-expanded state may extend substantially linearly or at least partially arcuately from the first side to the second side. A second tray portion may be adjacent the first tray portion, the second tray portion having a proximal side and a second plurality of ports extending substantially linearly or at least partially arcuately along the proximal side of the second tray portion. The first and second tray portions may be integrally formed or non-integrally formed. The first and second tray portions may be translatable in proximal and distal directions with respect to one another. The first and second tray portions may be operably linked such that translation of one of the first or second tray portions in a proximal or distal direction causes translation of the other of the first or second tray portions in the same direction. At least two of the plurality of ports may be movable with respect to one another. A patch panel system may include a housing having a height and a plurality of patch panel devices, as described above, arranged along the height of the housing. Each of the plurality of patch panel devices may be configured to translate in proximal and distal directions with respect to the housing.

In another embodiment of the disclosure, a patch panel system includes a housing having a height and at least one patch panel device. The patch panel device may include a tray having substantially parallel first and second sides, a distal side extending from the first side to the second side, and a proximal side extending from the first side to the second side. The distal side may be substantially orthogonal to the first and second sides and may have a first length. The patch panel may also include a first connection means portion including a first plurality of ports extending along a first path on the proximal side and a second connection means portion including a second plurality of ports extending along a second path on the proximal side. The first and second paths may define a total length when the connection means in a non-expanded state, the total length being greater than the first length. The first and second paths may be substantially linear or may each be at least partially arcuate. The first and second paths may follow a single arcuate path or different arcuate paths.

In a further embodiment of the disclosure, a communication patch panel system includes a tray slidable distally into a housing and proximally out of the housing. The system may also include a plurality of connectors of a first type, the first type connectors each coupled to an arm, each arm having a distal end pivotably coupled to the tray. A track may be positioned on the tray. A connector holder may be slidably coupled to the track, and a connector of a second type may be coupled to the connector holder. The second type connector may have a dimension that is greater than a dimension of each first type connector.

In still a further embodiment of the disclosure, a communication patch panel system includes a tray slidable distally into a housing and proximally out of the housing. A plurality of first connectors may each be coupled to an arm, each arm having a distal end pivotably coupled to the tray. The tray may include a track, and a connector holder may be slidably coupled to the track. At least one second connector may be coupled to the connector holder. The at least one second connector may have a stored state and a retracted state and may be positioned at least partially distal to the distal ends of the arms when in the stored state.

These and other features of the present invention will be more fully described with reference to the accompanying figures.

BRIEF DESCRIPTION OF THE DRAWINGS

By way of description only, embodiments of the present disclosure will be described herein with reference to the accompanying drawings, in which:

FIG. 14B is a perspective side view of a connector holder of the patch panel device of FIG. 14A;

FIG. 14C is a partial perspective view of one end of the connector holder of FIG. 14B;

FIGS. 14D-E are partial perspective views of another end of the connector holder of FIG. 14B according to different embodiments;

DETAILED DESCRIPTION

Figures 1A, 1B:
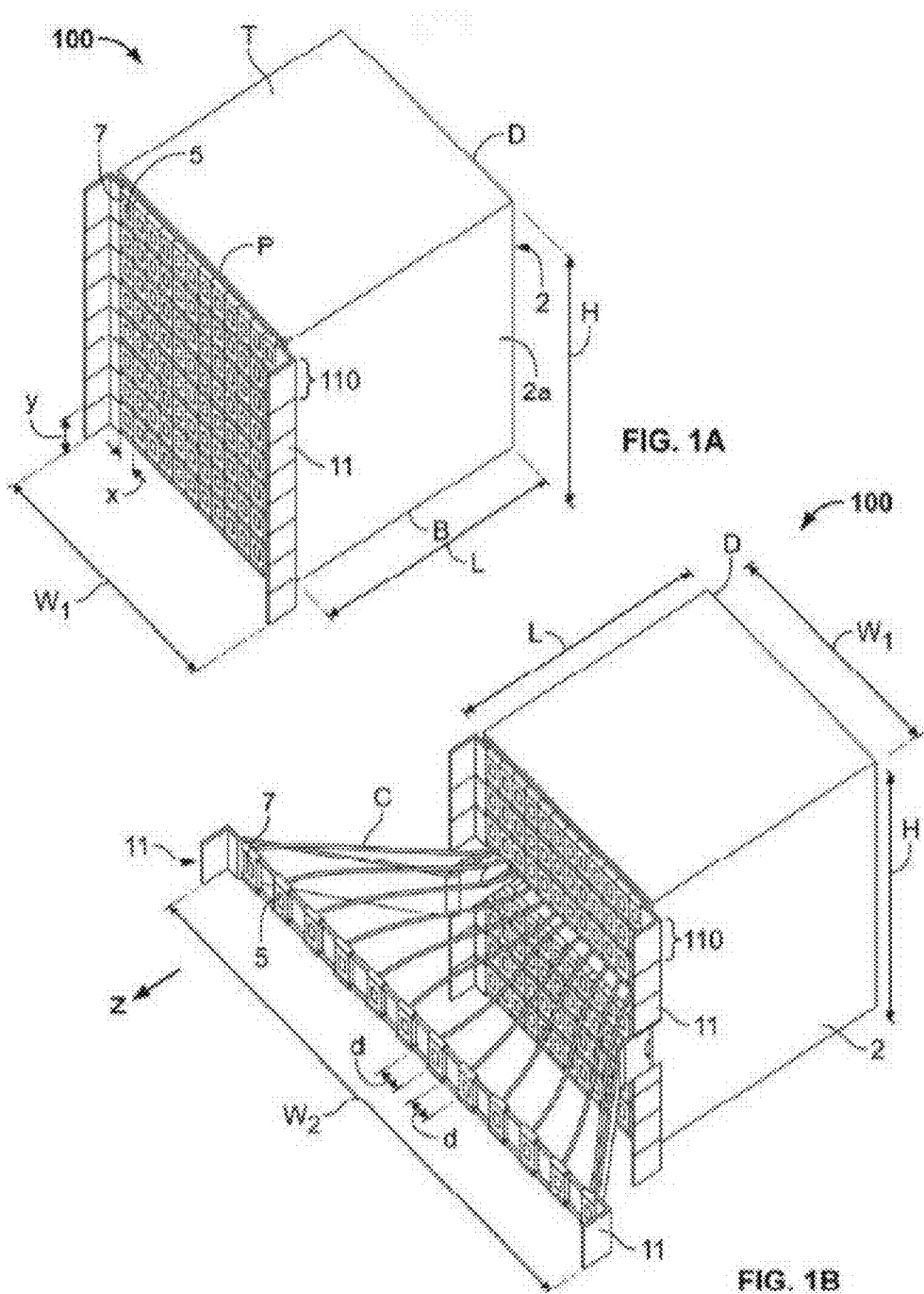
FIG. 1A is a front perspective view of a communication patching system including multiple patch panel devices shown in a first state.
FIG. 1B is the communication patching system of FIG. 1A shown in a second state.

Particular embodiments of the present disclosure will be described with reference to the accompanying drawings. In the figures and in the description that follow, in which like reference numerals identify similar or identical elements, the term "proximal" refers to the end of the device that is closest to the operator or user during use, while the term "distal" refers to the end of the device that is farther from the operator or user during use.

Now referring to FIGS. 1A-B, a communication patching system 100 may include a housing 2, e.g., a rack or a cabinet. The housing 2 may support one or more patch panel devices 110. The housing 2 may define a length L, a height H, and a width $W_1$. Each patch panel device 110 may include a plurality of adapters or ports 7, each port 7 having a receptacle 5 for securing a cable C (FIG. 1B) therein. The receptacle 5 of the port 7 may be operatively coupled to one or more cables C, e.g., the receptacle 5 may be in a simplex or in a duplex configuration. The port 7 may include a mounting portion 51 that frames the port 7 and facilitates securing of the port 7, or the receptacle 5, to connection means, e.g., rails 41, 43 (FIG. 2C). In some embodiments, the mounting portion 51 of the port 7 may be integrally formed with the port 7 or may be a separate component coupled to the receptacle 5, and in some embodiments the mounting portion 51 may form a part of a connection means to which the receptacle 5 is connected, as described below.

The patch panel device 110 may include a tab 11 on either end of the patch panel device 110 to facilitate a user grasping or handling of the patch panel device 110. The density of the number of ports 7 supported by the housing 2 may be a function of the dimensions of the housing 2. As shown in FIG. 1A, the ports 7, each of which has a width x and a height y, may be arranged in rows and columns in which the number of rows of ports 7 is directly correlated to the height H and the number of columns of ports 7 is directly correlated to the width $W_1$.

The communication patching system 100 may be transitionable between a first state (FIG. 1A) and a second state (FIG. 1B). In the first state, the one or more patch panel devices 110 may be positioned at a first location with respect to the proximal end or face P of the housing 2. As shown in FIG. 1A, the patch panel devices 110 may be substantially flush with respect to the face P of the housing 2. In the second state, one or more of the patch panel devices 110 may be moved proximally in the direction of arrow Z away from the proximal end or face P of the housing 2. As the patch panel device 110 is moved proximally, the ports 7 may be transitioned to be spaced apart from one another by a gap or spacing distance d (FIG. 1B).

Figure 2A:
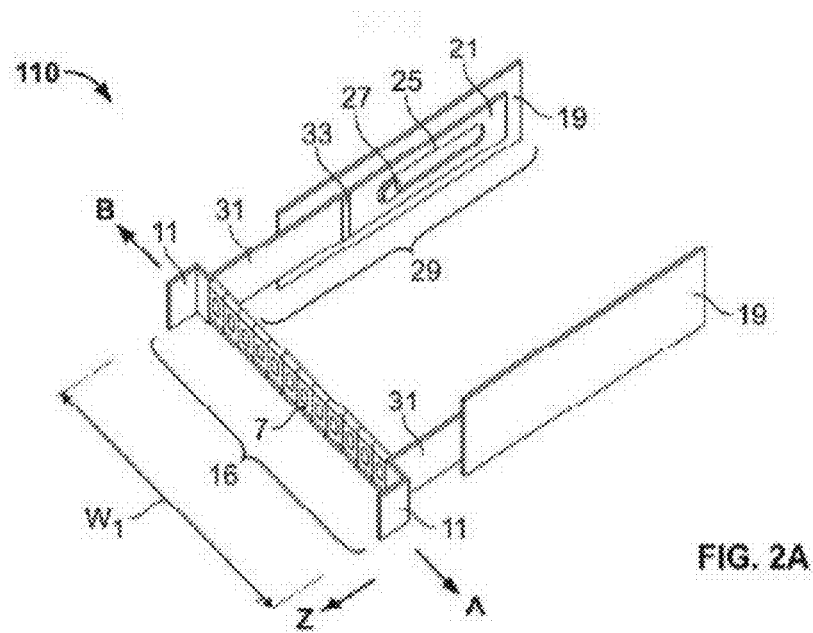
FIG. 2A is one of the patch panel devices of FIG. 1A shown in a first state.
Figure 2B:
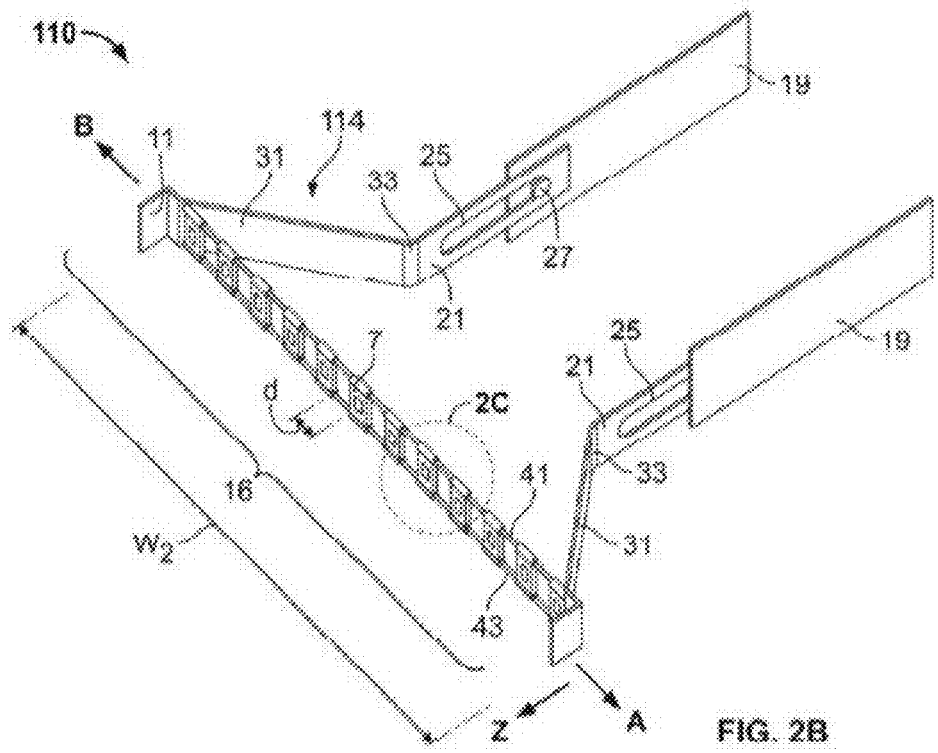
FIG. 2B is the patch panel device of FIG. 2A shown in a second state.
Figure 2C:
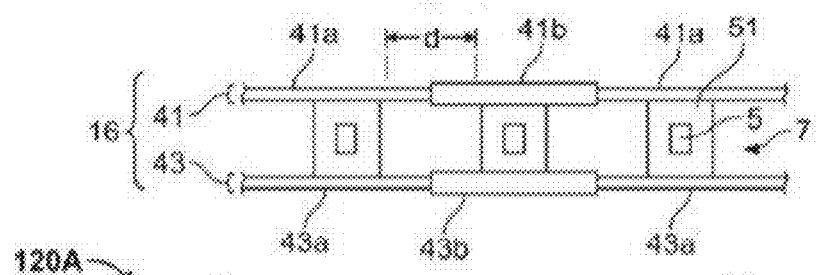
FIG. 2C is an enlarged view of the indicated area of FIG. 2B.

The patch panel device 110 may be transitionable between first and second states, as shown best in FIGS. 2A and 2B respectively. The patch panel device 110 may include bars 19, which facilitate mounting of the patch panel device 110 within the housing 2 by securing one of the bars 19 on each of opposite sides 2a of the housing 2. A hinged arm member 114, which includes a first arm section 21 and a second arm section 31, may be slidably connected to the bar 19. The first arm section 21 may include a slot 25 which is configured and adapted to receive a pin 27 therethrough. The pin 27 may secure the first arm section 21 to the bar 19 while permitting the first arm section 21 to slide relative to the bar 19 along the length of slot 25. The first arm section 21 and the second arm section of the hinged arm 114 may be pivotably connected to one another by a hinge 33, thereby facilitating the rotation of the second arm section 31 relative to the first arm section 21.

The ports 7 may be operably coupled to a connection means 16. As the connection means 16 transitions from a first length equal to width $W_1$ (FIG. 2A) to a second, expanded width $W_2$ (FIG. 2B), the ports 7 may move, or be moveable, to be positioned in a spaced apart relation. In an embodiment, the ports 7 are spaced apart. The ports 7 may be equidistantly spaced apart by equal gaps or spacing distances d. However, the spacing distances d between adjacent ports 7 may differ, i.e., be non-uniform, in the second state. In addition, individual ports 7 may be slid or moved along the length of the connection means 16, thereby facilitating adjustment of the gap or spacing distances d between adjacent ports 7 as desired by the user or technician.

It is contemplated that the hinged arm member 114 may include a lip (not shown) that interacts with a groove (not shown) defined within the bar 19 along a portion or substantially the entire length of the bar 19 to provide added stability and controlled movement of the hinged arm member 114 relative to the bar 19.

As shown best in FIG. 2C, the connection means 16 may include one or more telescopic rails 41, 43 that are slidable to adjust the overall length of the connection means 16. Although shown in FIG. 2C as having two parallel rails 41, 43, a single rail may be used. It should be noted that the greater the overall length of the connection means 16, the greater the gap or spacing distance d achievable between adjacent ports 7. Each of the parallel rails 41, 43 may include alternating sections 41a, 41b and 43a, 43b respectively. Sections 41a, 43a may be configured and adapted to slide within sections 41b, 43b respectively, where the ports 7 may be coupled to the sections 41b, 43b, to effect lengthening or shortening of the connection means 16. A resilient or biasing member (not shown) may be placed within a hollowed out center of each of the rails 41, 43 to bias the connection means 16 to one of the first or second dimensions $W_1$, $W_2$, respectively.

The sections 41b, 43b may define an open circumference such that the ports 7 will not obstruct movement of the alternating sections 41a, 41b and 43a, 43b relative to one another such that the ports 7 may be moved in closer proximity to one another. In addition, the lengths of the alternating sections 41a, 41b and 43a, 43b may be selected to facilitate placement the ports 7 in close proximity to one another, such that adjacent ports contact each other. Each port 7 may be secured to the rails 41, 43 in a variety of ways or may be integrally formed with the rails 41, 43. It is contemplated that in other embodiments, the rails 41, 43 may be substituted with different connection means. In an embodiment, the rails 41, 43 may be substituted with elastic bands.

Figure 3A:
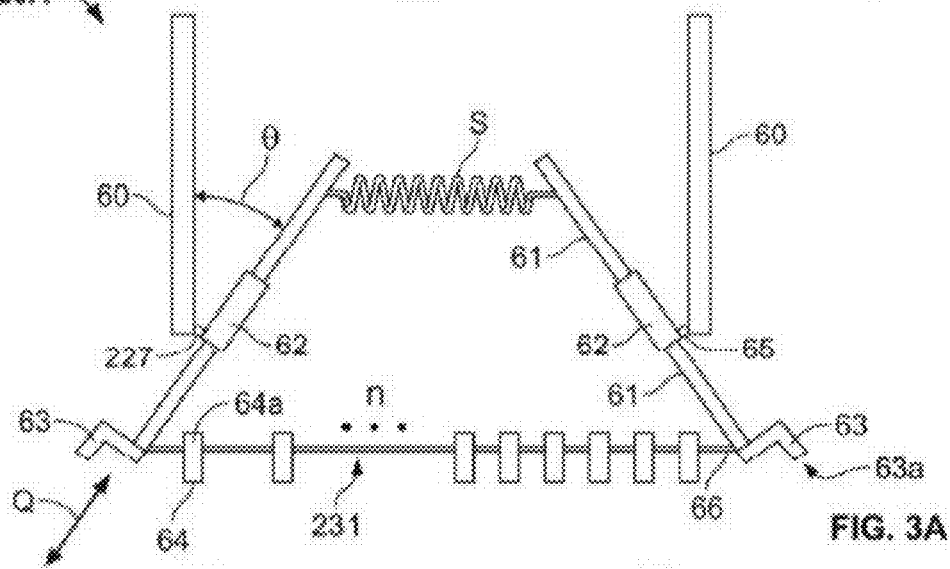
FIG. 3A is a top view of another embodiment of a patch panel device.

Another embodiment of a patch panel device is illustrated in FIG. 3A. A patch panel device 120A may include bars 60 that are mountable within the housing 2 described above in connection with communication patching system 100. A sleeve 62 may be pivotably connected by a hinge 227 to each of the bars 60 such that the sleeve is angularly movable with respect to the bar 60, thereby facilitating angling of the sleeve 62 with respect to the bar by an angle θ. An arm member 61 may be slidably translatable through each sleeve 62 in the directions of arrows Q. Both distal translation of the arm members 61 outward from the sleeves 62 and an increase in the angle θ between the sleeves and the corresponding bars 60 may result in a lengthening of connection means 231. The connection means 231 may be a resilient member that will stretch in response to an increase in the separation between distal ends 63a of the arm members 61 with respect to each other. Tabs 63 at the distal ends 63a of the arm members 61 may facilitate a user or technician gripping the arm members 61 and effecting both the angular and axial movement of the arm members 61. Disposed along and connected or coupled to the connection means 231 may be n number of ports 64 that are each configured and adapted to receive a suitable connector and/or cable. A channel 64a may be defined within each of the ports 64, to receive the connection means therein and facilitate sliding of the ports 64 along the length of the connection means. A resilient or biasing member S, e.g., a spring, may be positioned at the distal end of each of the arm members 61, thereby effecting or causing transitioning of the connection means 231 to an expanded state upon sliding the arm members 61 proximally through the sleeves 62.

Figure 3B:
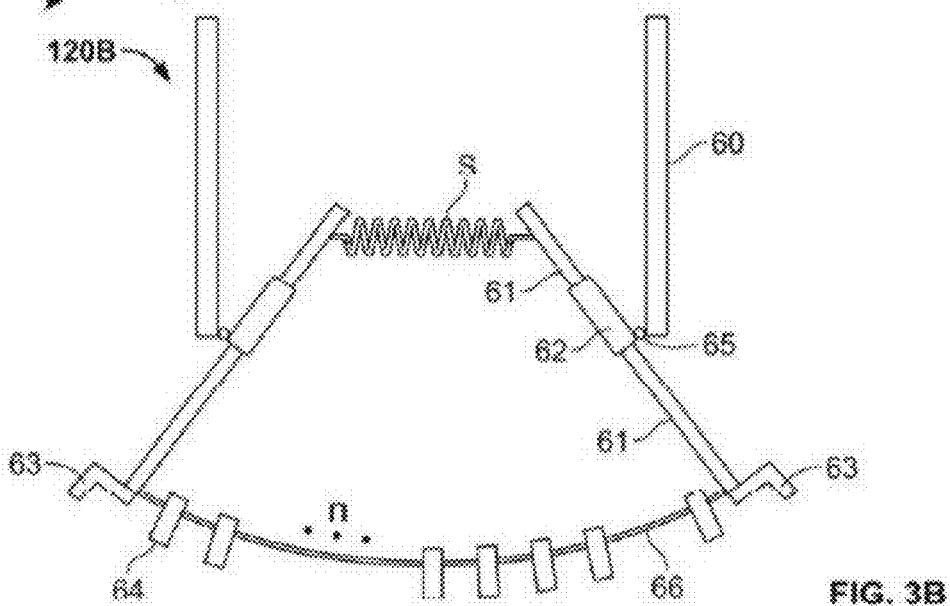
FIG. 3B is a top view of yet another embodiment of a patch panel device.

As shown in FIG. 3B, a patch panel device 120B is substantially similar to the patch panel device 120A and may include all of the features of the patch panel device 120A with the following exception: instead of using connection means 231, which is shown as defining a generally straight shape, a connection means 66 may be used that defines a generally arcuate shape.

Figure 4:
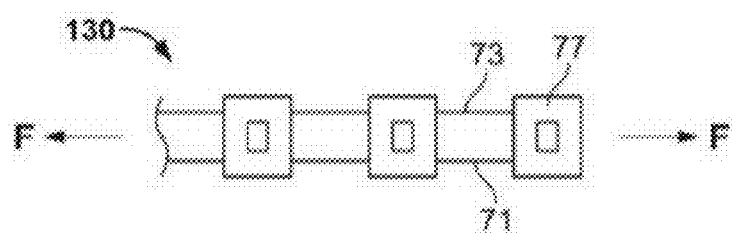
FIG. 4 is a front view of a portion of a further embodiment of a patch panel device.

Other embodiments of a connection means are described with reference to FIGS. 4-6B. As shown in FIG. 4, a patch panel device 130 may include ports 77 that are operably connected to one another by one or more resilient members or bands 71, 73, thereby facilitating a stretching of the bands 71, 73 and a corresponding increase in the spacing or gaps between the ports 77 upon application of a force as indicated by the directional arrows F.

Figure 5:
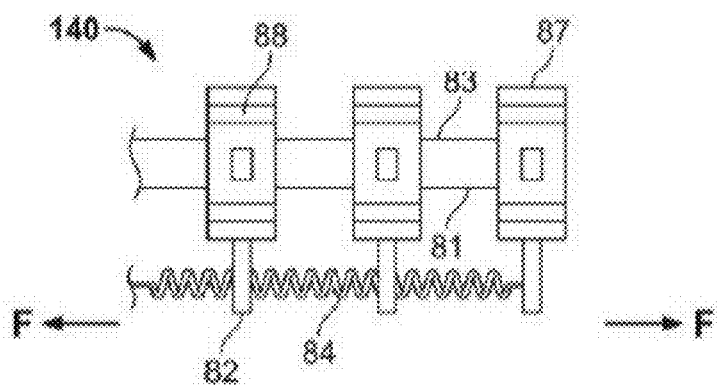
FIG. 5 is a front view of a portion of still another embodiment of a patch panel device.

As shown in FIG. 5, a patch panel device 140 may include a plurality of ports 87 slidable with respect to one another along one or more rails 81, 83 that are receivable within channels 88 that extend through the width of each port 87. Each port 87 may include a post 82 that is operably coupled to a resilient member 84, e.g., a spring, which extends the length of the connection means 140. The resilient member 84 may uniformly stretch upon the application of a force as indicated by the arrows F, thereby facilitating equidistant spacing of the ports 87 with respect to one another. In this embodiment, the rails 81, 83, in combination with the channels 88 and posts 82 which correspond to mounting portions of the ports 87, and the resilient member 84 may form the connection means.

Figure 6A:
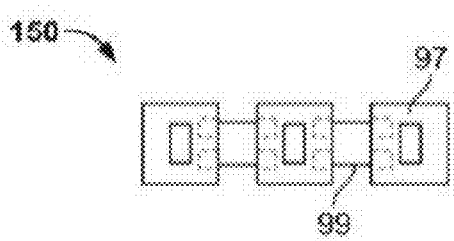
FIG. 6A is a front view of a portion of yet another embodiment of a patch panel device including multiple ports.
Figure 6B:
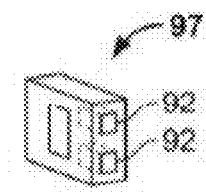
FIG. 6B is a perspective view of one of the ports of FIG. 6A.

As shown in FIGS. 6A and 6B, a patch panel device 150 may include a plurality of ports 97 including one or more bars 99 that are receivable within slots or grooves 92 defined within each port 97. The bars 99 may secure and stabilize the ports 97 with respect to one another. In this embodiment, the bars 99 and the grooves 92, which correspond to mounting portions of the ports 97, may form the connection means. In operation, as the ports 97 are moved toward one another, the bars 99 may be received within the slots 92; as the ports 97 are moved apart from one another, the bars 99 may be withdrawn from within the slots 92.

Figure 7A:
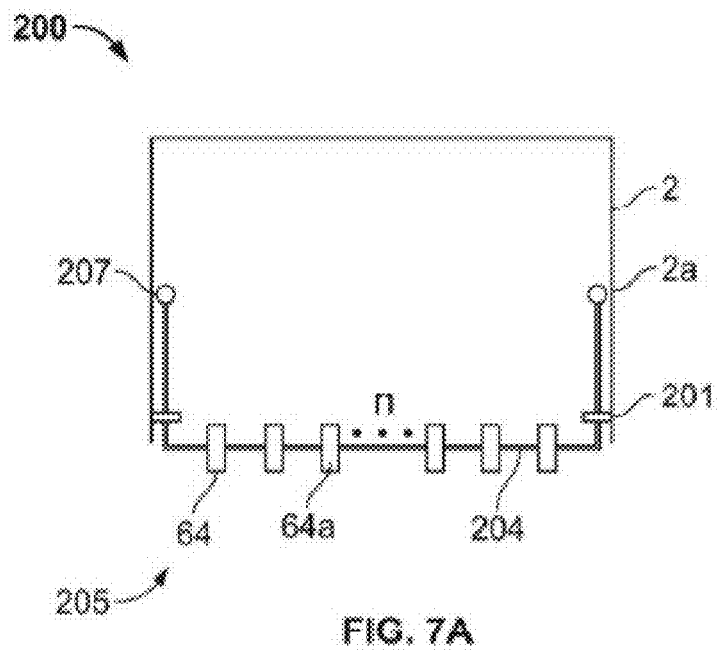
FIG. 7A is a top view of another embodiment of a patch panel device shown in a first state.
Figure 7B:
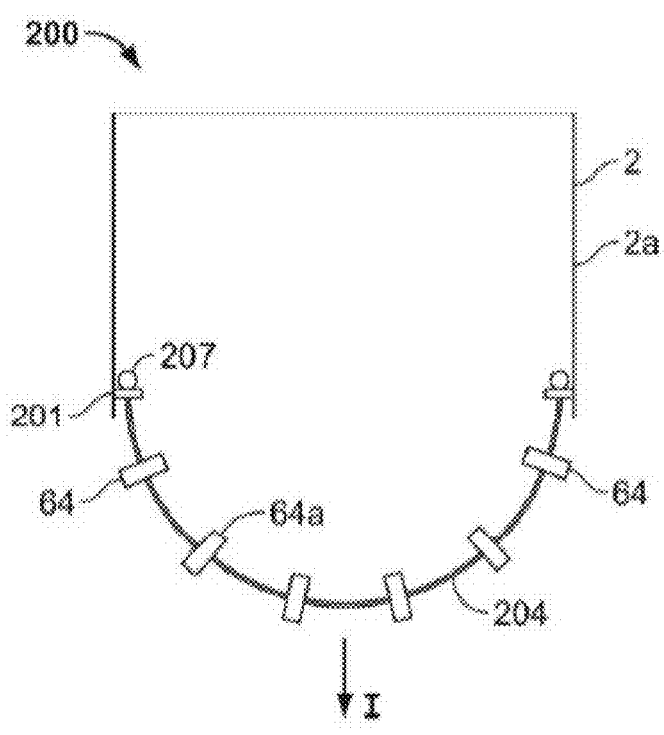
FIG. 7B is a top view of the patch panel device of FIG. 7A shown in a second state.

Another embodiment of a communication patching system is described with respect to FIGS. 7A and 7B. A communication patching system 200 may include the housing 2 and one or more patch panel devices 205 supported therein. The patch panel device 205 may include a flexible member 204, e.g., a bar made from a shape memory material such as nickel titanium. The flexible member 204 may be received within channels 64a of the ports 64 such that the ports 64 are slidable along the length of the flexible member 204. The channel 64a of each port 64 may frictionally engage the flexible member 204 such that the port 64 moves in response to being intentionally moved by a user or technician, but does not move unintentionally. Holders 201 may secure the flexible member 204 to the sides 2a of the housing 2. A bulbous region 207 of the flexible member 204 may inhibit the complete withdrawal of the flexible member 204 from the housing 2. As the flexible member 204 is moved in the direction indicated by arrow I, the flexible member 204 may bow outward from a generally straight shape to an arcuate shape. This transition may be caused by the shape-memory alloy being biased to return (or attempting to return) to a particular previous shape that may have been earlier set, for example by heat setting. As illustrated in FIG. 7A, flexible member 204 may be at least partially restrained by holders 201. However, upon moving flexible member 204 proximally, as shown in FIG. 7B, the restriction on flexible member 204 by holders 201 is lessened. This reduction in restrictive force may allow the flexible member 204 to attempt to return to its set shape. The bowing out of the flexible member 204 may result in a greater length along which the ports 64 may slide with respect to the flexible member 204, thereby facilitating increased spacing between adjacent ports 64.

Figure 8A:
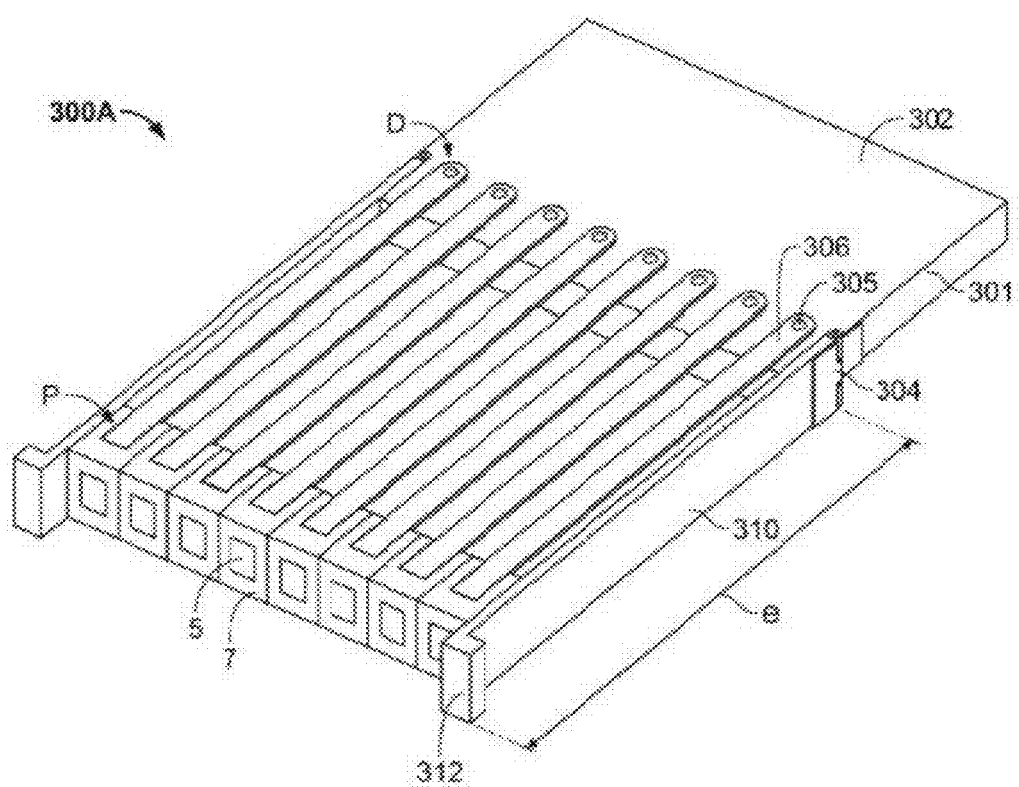
FIG. 8A is a perspective view of a still further embodiment of a patch panel device shown in a first state.
Figure 8B:
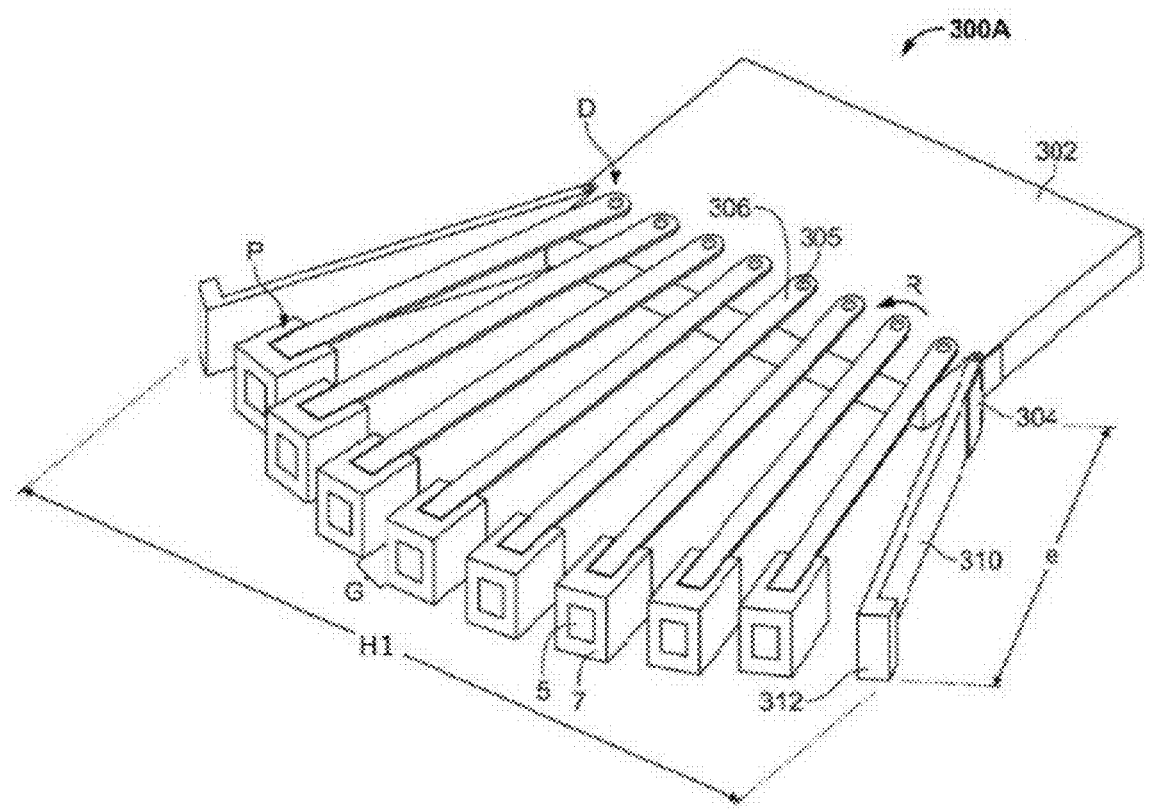
FIG. 8B is a perspective view of the patch panel device of FIG. 8A shown in a second state.

Another embodiment of a patch panel device is described with reference to FIGS. 8A and 8B. A patch panel device 300A may include a connection means transitionable between a first state (FIG. 8A) and a second state (FIG. 8B). The patch panel device 300A may include a tray 302 and a plurality of arms 306 that are each operatively coupled in a pivotable relationship with the tray 302. Each arm 306 may be operably coupled to a port 7 including a receptacle 5 at a proximal end P of the arm 306. A pin 305 may pivotably connect the distal end D of each arm 306 to the tray 302. The tray 302 may be slidably received within a housing, e.g., housing 2 (FIG. 1A), such that the patch panel device 300A is translatable in a direction toward or away from the distal end D of the housing 2. Bars 310 may facilitate the translation of the tray 302 with respect to the housing 2. The bars 310 may be pivotably coupled to opposing sides 301 of the tray 302. Translation of tray 302 a distance e corresponding to the length of the bar 310 away from the housing 2 may facilitate pivoting of the bars 310 by minimizing the interaction between the bar 310 and the housing 2 that may otherwise impede such movement. Each bar 310 may include a tab 312 that facilitates a user grasping the bar 310 and translating the tray 302 in a proximal or distal direction. Proximal translation of the tray 302 away from the housing 2 may result in the ports 7 being laterally spaced from the face P of the housing 2. Proximal translation of the tray 302 by a distance corresponding to the length e of the bar 310 may allow each of the opposing bars 310 to pivot outwardly thereby increasing the distance H1 between proximal ends of the opposing bars 310. The bars 310 may include tabs 312 to facilitate gripping or grasping of the patch panel device 300A by the user. By increasing distance H1 between the proximal ends of the bars 310, the ports 7 may be spaced apart by a greater gap distance G. Repositioning of the ports 7 with respect to one another such that a desired gap distance G between ports 7 is achieved may be accomplished by rotating the arms 306 about pin 305 in or opposite to the direction indicated by arrow R. In this embodiment, the connection means may include at least the arms 306, the bars 310, the pins 305 and the ports 7, and optionally the tabs 312.

Figure 9A:
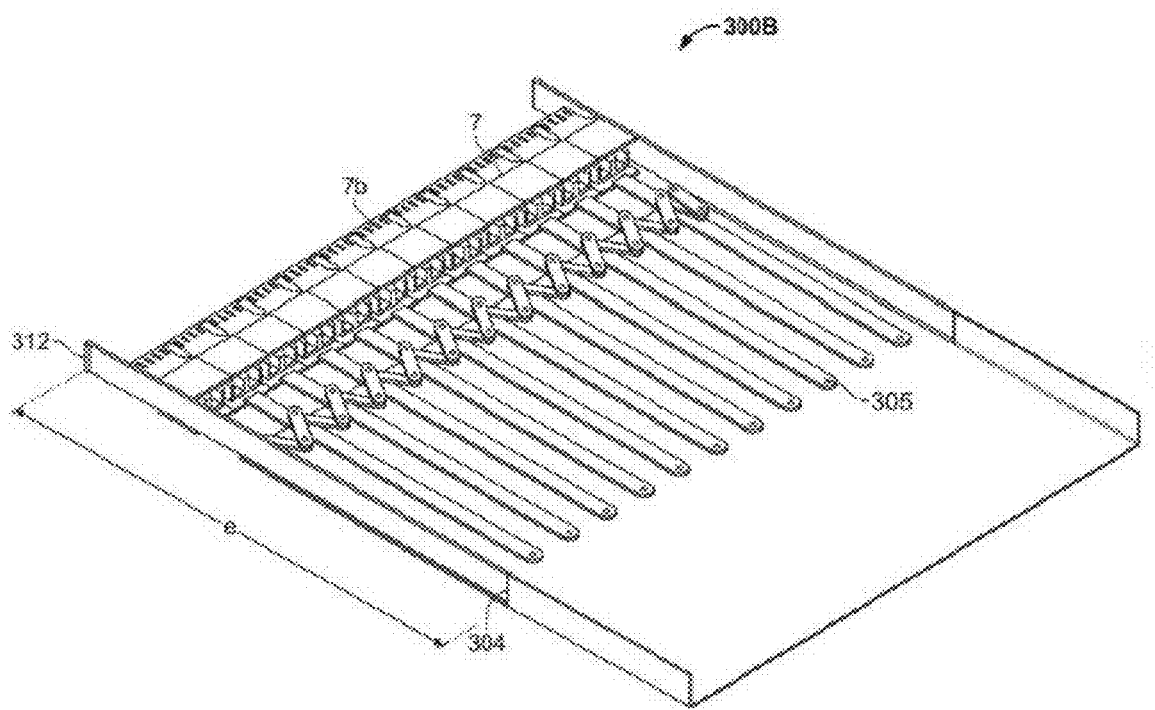
FIG. 9A is a perspective view of yet another embodiment of a patch panel device shown in a first state.
Figure 9B:
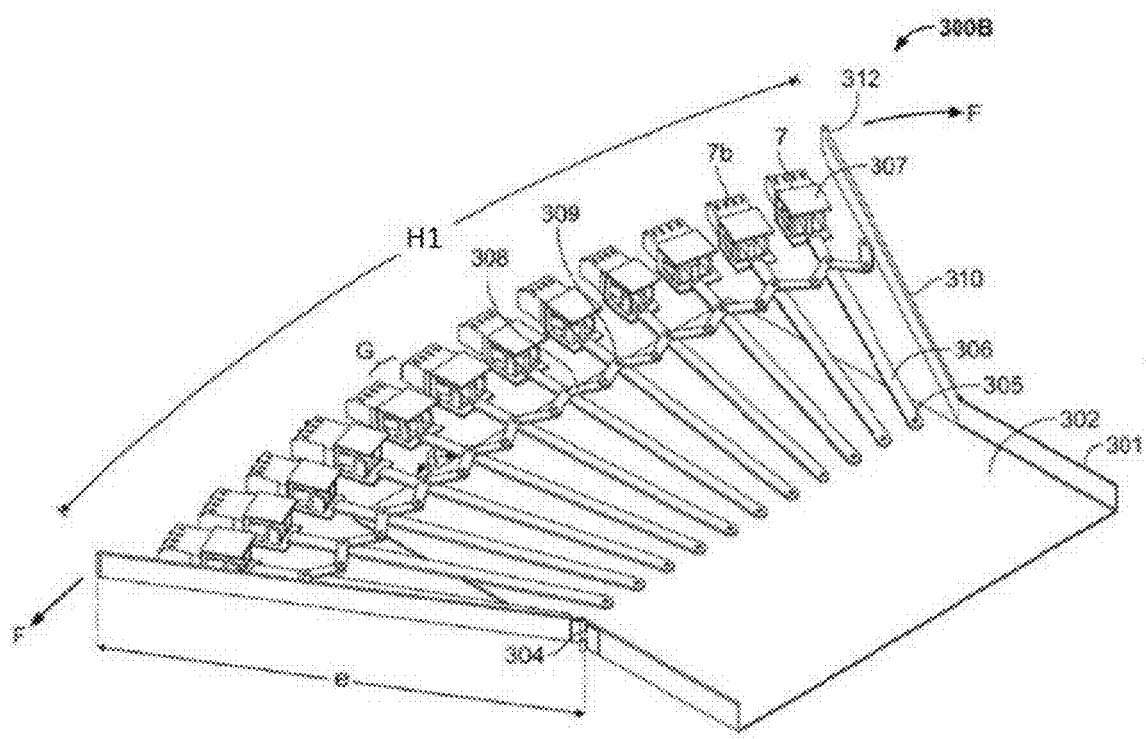
FIG. 9B is a perspective view of the patch panel device of FIG. 9A shown in a second state.

A further embodiment of a patch panel device is described with reference to FIGS. 9A and 9B. A patch panel device 300B may include a connection means transitionable between a first state (FIG. 9A) and a second state (FIG. 9B). In the first state, adjacent ports 7 may be substantially in close proximity to one another, e.g., touching. In the second state, the adjacent ports 7 may have a gap distance G between one another. The patch panel device 300B may include tray 302 and a plurality of pivotable arms 306 that are operatively coupled to the tray 302. Each arm 306 may be operatively coupled to a port 7 including a receptacle 5. The arms 306 may be radially separable in a fan-like configuration such that gap distance G between the arms 306 is adjustable. A connector 7b, e.g., a simplex or duplex connector, may be positioned within the receptacle 5. The arms 306 may be operatively coupled to one another, as well as to bars 310, by links 308 that are joined to each other by pins 309. As the bars 310 are spread apart by applying a force in the directions indicated by arrows F, thereby increasing the distance H1 between the bars 310, the angle β between the links 308 may be increased and the gap distance G between adjacent ports 7 may also be increased. In an embodiment, by pulling the bars 310 apart from one another in the directions indicated by arrows F, the gap distance G between each arm 306 may be substantially equal. To collapse the array of arms 306 and transition the patch panel device 300B back to the first state (FIG. 9A), a force in a direction opposite to that indicated by arrows F may be applied such that the interaction between the bars 310 and arms 306 results in transitioning of the patch panel device 300B to the collapsed, first state, thereby allowing the patch panel device 300B to be placed within a housing, e.g., housing 2. In this embodiment, the connection means may include at least the arms 306, the bars 310, the pins 305 and the ports 7, the links 308, the pins 909, and optionally the tabs 312.

Figure 10A:
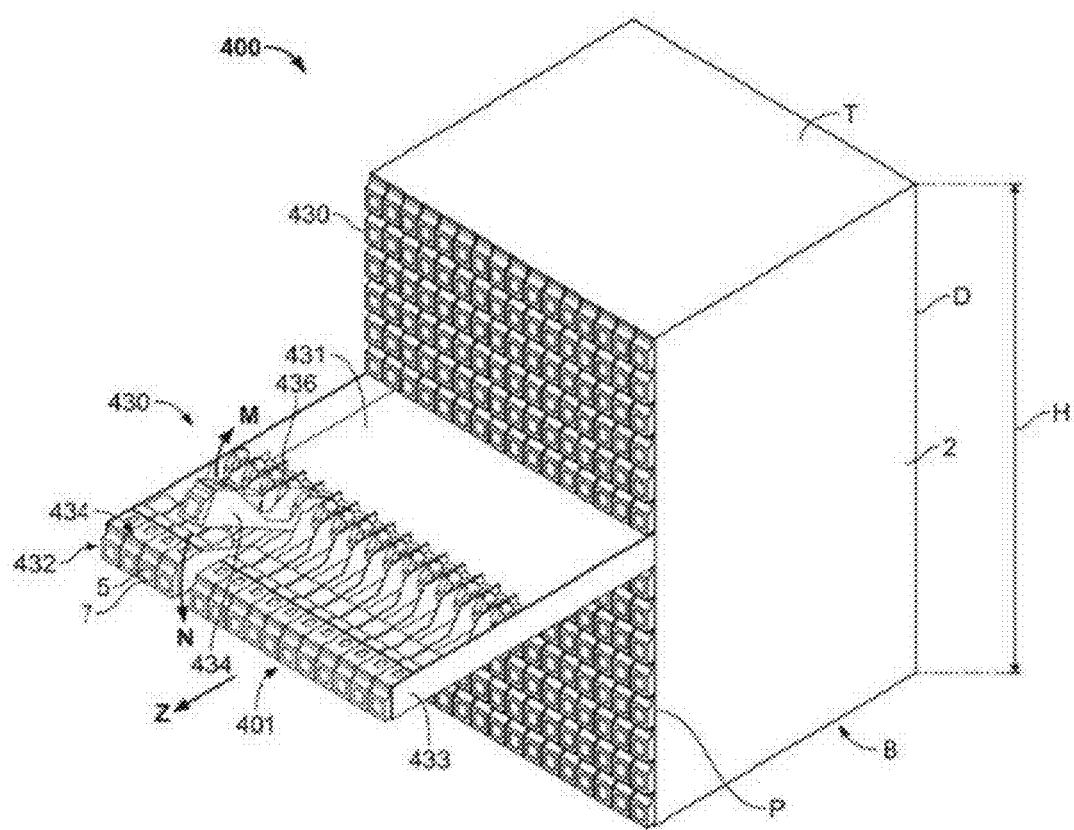
FIG. 10A is a front perspective view of a communication patching system including multiple patch panel devices.

A communication patching system 400 is described with reference to FIGS. 10A-E. As shown in FIG. 10A, the communication patching system 400 may include housing 2, which supports one or more patch panel devices 430, shown in more detail in FIG. 10B. The patch panel device 430 may be translatable in or opposite to a direction indicated by arrow Z, e.g., slidable into and out of the housing 2. The patch panel device 430 may include a tray 431 including sidebars 433 to facilitate stabilization and guidance of the patch panel device 430. A plurality of attachment members 432, which are each configured and adapted to be operatively coupled to cables C, may be secured to the tray 431.

The attachment member 432 may include a second section 436 attached to a first section 434 by a hinge 441 that facilitates radial movement of the first section 434 relative to the second section 436 in the directions indicated by arrows M and N. Port 7 may be releasably securable to the first section 434. In an embodiment, the first section 434 may include a window 443 and the port 7 may include a tab 445 configured and adapted to engage the window 443 to releasably secure the port 7 to the first section 434.

In an embodiment, one of the first and second sections 434, 436 may include a ridge or a bump 438a that is engageable with a groove or dent 438b within the other of the first and second sections 434, 436 such that the first and second sections 434, 436 are positionable relative to one another in a plurality of positions corresponding to the number of pairs of bumps 438a and grooves 438b.

Figure 10B:
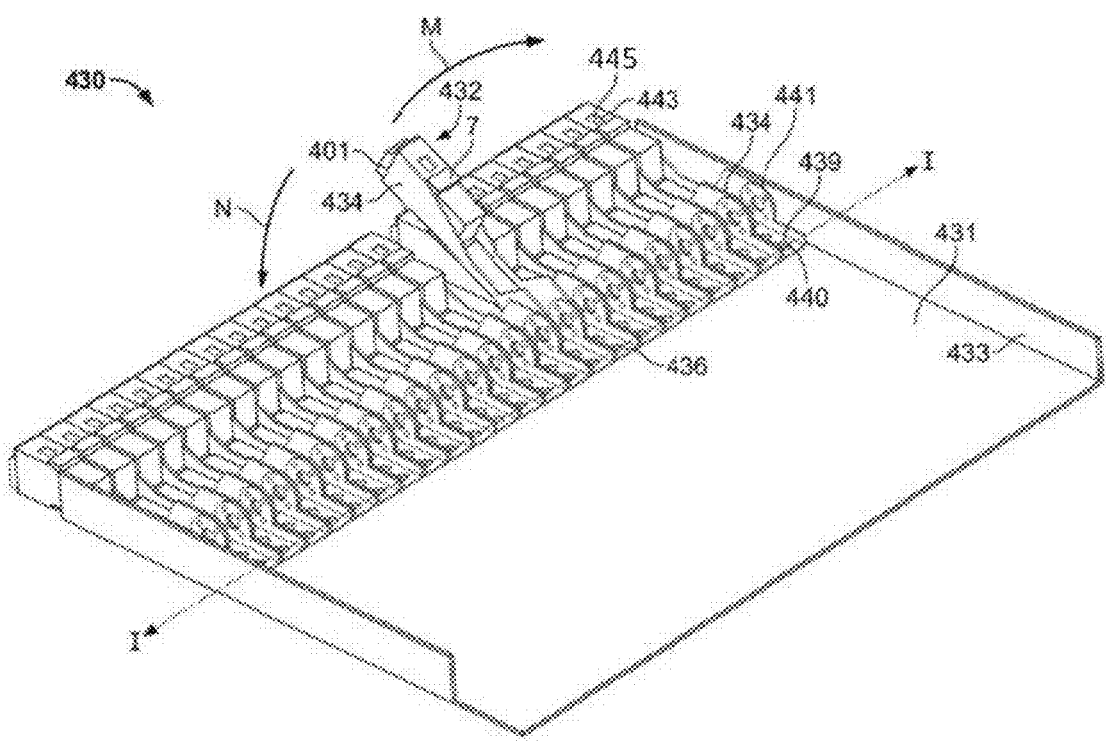
FIG. 10B is a perspective view of one of the patch panel devices of FIG. 10A including a plurality of attachment members.
Figure 10C:
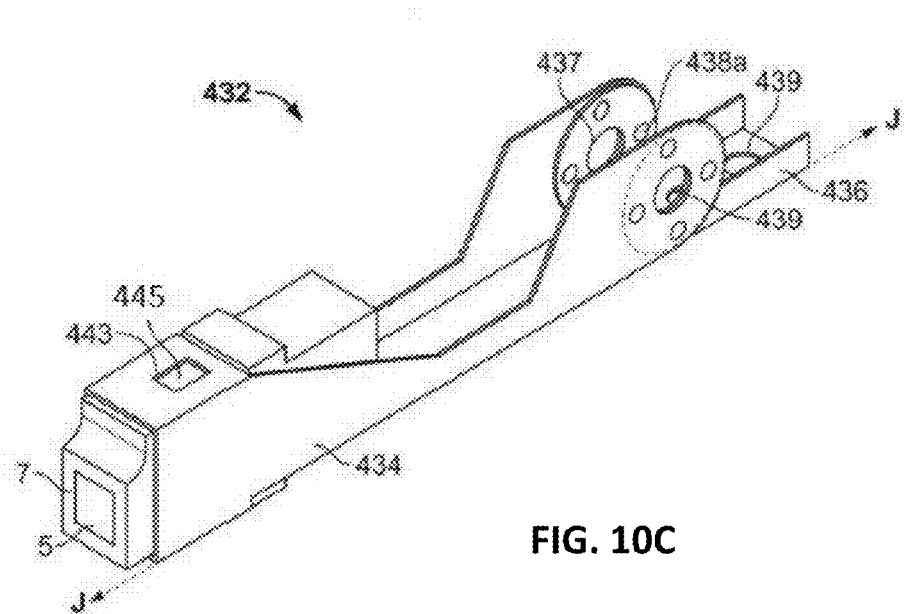
FIG. 10C is a view of one of the attachment members of FIG. 10B shown in a first state.
Figure 10D:
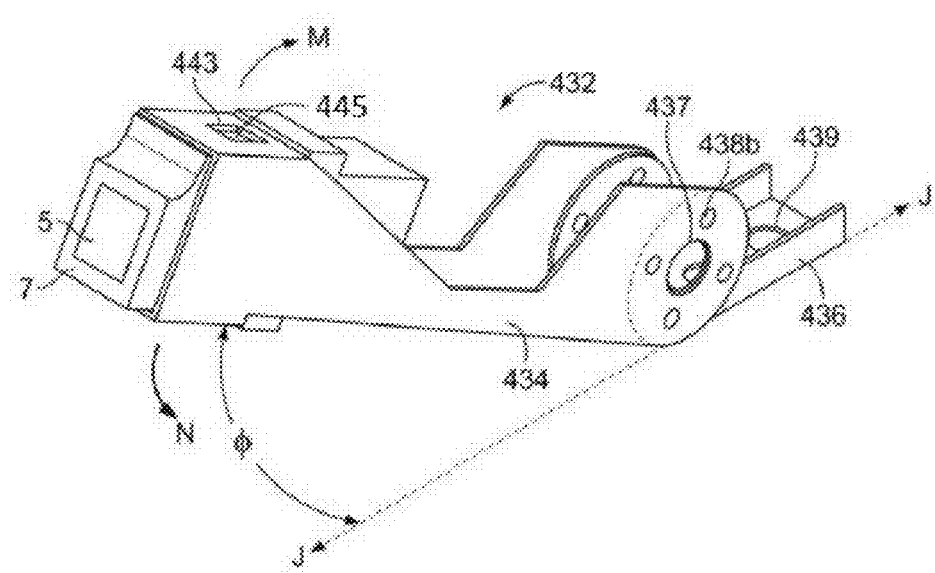
FIG. 10D is a view of the attachment member of FIG. 10C shown in a second state.

As shown in FIGS. 10C and 10D, the attachment members 432 may include the first and second sections 434, 436, and may be transitionable between a first state in which the first and second sections 434, 436 are substantially aligned along common axis J (FIG. 10C) and a second state in which the first and second sections 434, 436 are bent with respect to one another such that the first section 434 defines an angle φ with respect to axis J, which extends along the length of the second section 436. The first and second sections 434, 436 may be disposed to be contacting each other in a frictional relationship, so as to inhibit inadvertent repositioning of the first and second sections 434, 436 with respect to each other.

Figure 10E:
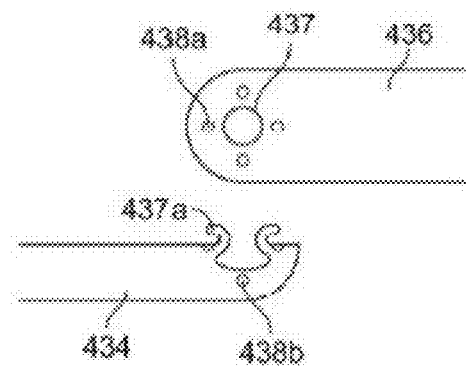
FIG. 10E is a partial view of the attachment member of FIG. 10C with parts shown separated.

In an embodiment, as shown in FIG. 10E, the first and second sections 434, 436 may be configured to engage each other in a grommet-like relationship to inhibit separation of the first and second sections 434, 436. The first section 434 may include a lip 437a, which is configured to engage an aperture 437, i.e., the lip 437a substantially follows along and contacts the perimeter of the aperture 437, of the second section 436 to inhibit separation of the first section 434 from the second section 436.

As shown best in FIG. 10B, a plurality of attachment members 432 may be secured to the tray 431. In an embodiment, the attachment members 432 may be linearly arranged with respect to one another along a common axis I. Each attachment member 432 may include the first section 434 and the second section 436, which are pivotably secured to each other. The second section 436 may be fixedly secured to the tray 431. In an embodiment, the second section 436 may include one or more holes 439 configured and adapted to receive a suitable device 440, e.g., a screw, nail, tack, or the like, to facilitate securing of the attachment member 432 to the tray 431. In an embodiment, the second section 436 may be fixedly secured to the tray 431 by an adhesive.

As shown best in FIG. 10A, the plurality of patch panel devices 430 may be arranged along height H of the housing 2. During use, the communication patching system 400 may facilitate access to the ports 7 that are operatively coupled to the attachment members 432. As shown in FIG. 10A, tray 431 may be translated away from the face P of the housing 2 in the direction of arrow Z. Translating the tray 431 away from the face P of the housing 2 may separate the proximal end 401 of the patch panel device 430 from adjacent rows of patch panel devices 430. Once the patch panel device 430 is translated a sufficient distance in the direction of arrow Z, the first section 434 of one or more of the attachment members 432 may be radially translated about an axis parallel to the axis I (see FIG. 10B), such as in direction M towards a top T of the housing 2 or in direction N towards a bottom B of the housing 2. Thus, the first section 434 of an attachment member 432 may be spaced apart from adjacently positioned attachment members 432 of the same patch panel device 430, as well as attachment members 432 of attachment members 432 of patch panel devices 430 positioned in adjacent rows along height H of the housing 2.

Another embodiment of a patch panel device is described with reference to FIGS. 11A-11D. A patch panel device 530 may include a plurality of attachment members 532 that are positioned adjacent to one another. Each attachment member 532 may include a movable member 546, which is rotatable or pivotable relative to a movable member of another attachment member 532. The movable members 546 of adjacent members 532 may be operatively coupled to one another to permit rotation of one of the movable members 546 relative to the other movable member. In an embodiment, the movable members 546 may be coupled to one another in a snap-fit connection that permits radial movement of the movable members 546 relative to one another. At least two securement members 544 may be secured to opposing ends of the plurality of attachment members 532 and secure the attachment members 532 to a tray 531. In another embodiment, a securement member 544 may be positioned between each of the movable members 546. Each of the movable members 546 may be operatively coupled to one or more cables C3, which are shown only in part. The movable member 546 may include a cable adapter or connector 549, which may include a front surface 549a that may be operatively coupled to one cable C3 and a back surface 549b that may be operatively coupled to another cable C3. The movable member 546 may include a receptacle 547 in which the connector 549 may be releasably secured such that the connector 549 may be separated from the attachment member 532.

The movable members 546 may be positioned and/or spaced a distance from an edge 531a of the tray 531 to permit the movable members 546 to rotate relative to the tray 531. In one embodiment, the tray 531 may include a cut-out (not shown) at the movable members to facilitate a range of movement of the movable members 546 relative to the tray 531. The tray 531 may have an axis z extending along its length, an axis y extending along its height, and an axis x extending its width. The securement member 544 may be coaxially aligned with the axis z extending along the length of the tray 531. A plurality of securement members 544 may be positioned in a row extending along axis x along the width of the tray 531.

Figure 11A:
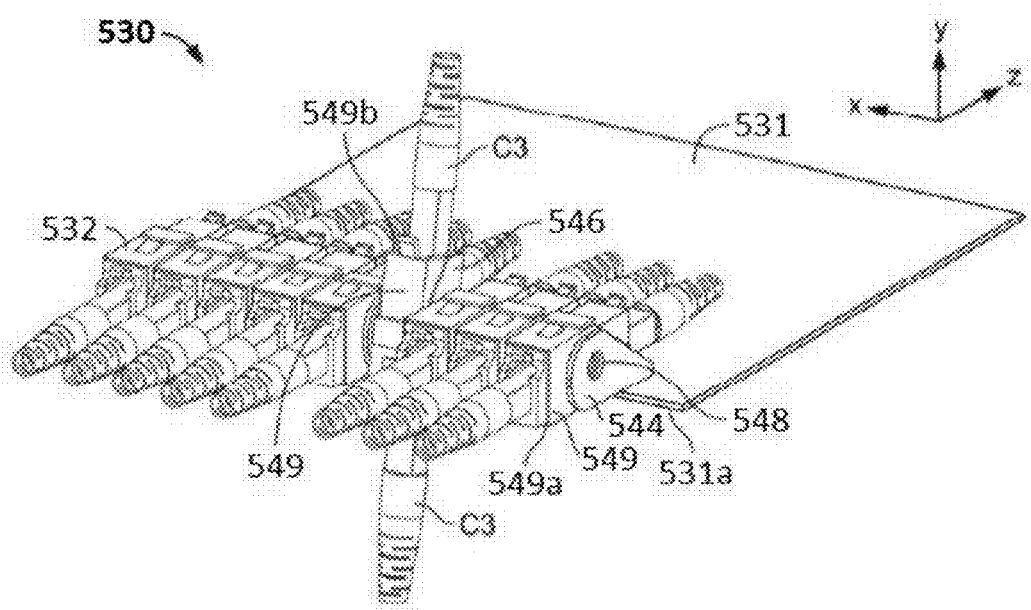
FIG. 11A is a perspective view of another embodiment of a patch panel device including a plurality of attachment members.
Figure 11B:
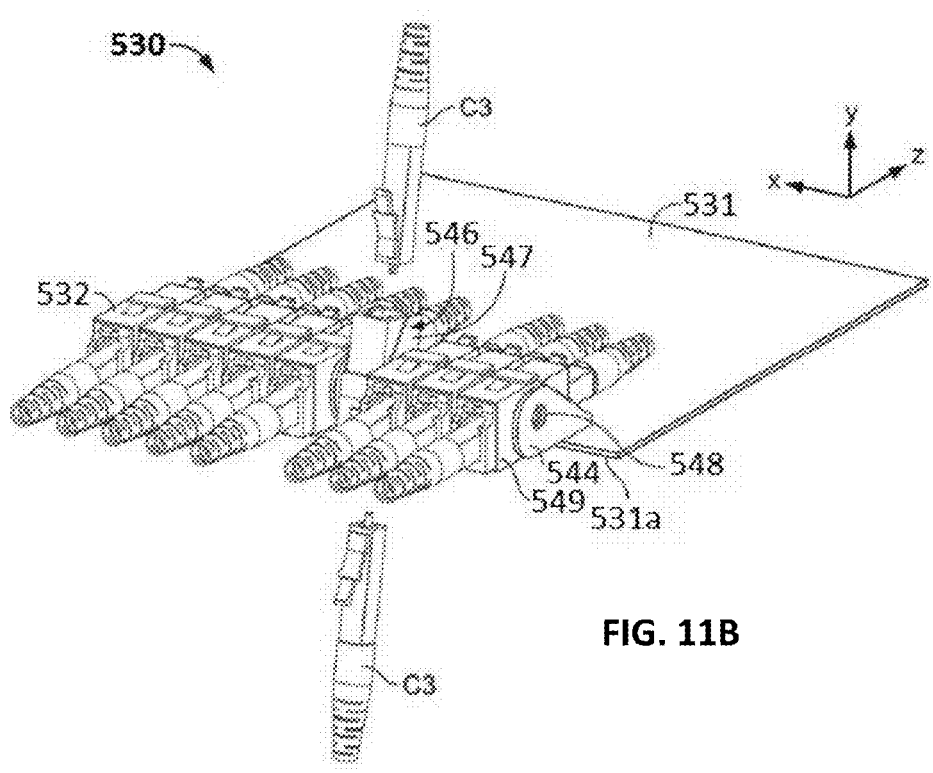
FIG. 11B is a perspective view of the patch panel device of FIG. 11A in which cables have been separated from one of the attachment members.
Figure 11C:
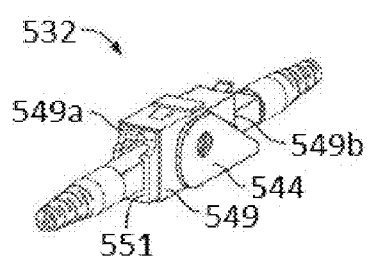
FIG. 11C is a perspective view of one of the attachment members of FIG. 11A shown in a first condition.
Figure 11D:
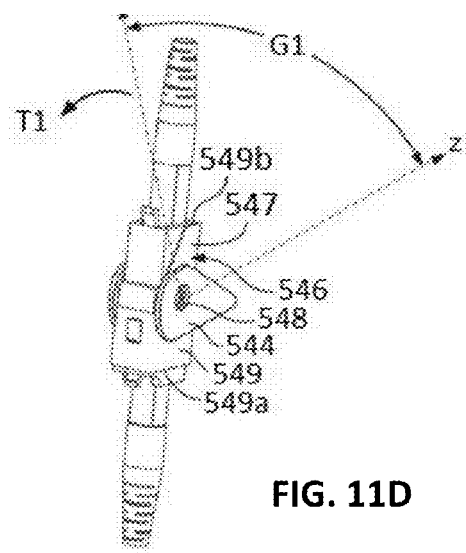
FIG. 11D is a perspective view of one of the attachment members of FIG. 11A shown in a second condition.

As shown in FIGS. 11C-11D, the securement member 544 and a movable member 546 of the attachment member 532 may be pivotably connected to one another at a pivot point 548 such that the movable member 546 may be radially moved relative to the securement member 544 to define an angle G1 therebetween. In particular, the movable member 546 may radially pivot between the y and z axes and the angle G1 may be defined therebetween. When secured to the tray 531, the movable member 546 may pivot in a counterclockwise direction T1, but may be inhibited from pivoting in the opposite, clockwise direction by the tray 531. However, as discussed above, cut-outs in the tray 531 may reduce the interaction between the tray 531 and the movable member 546 to facilitate a greater range of movement of the movable member 546 with respect to the tray 531. In an embodiment, the angle G1 may be adjusted within a range between about 0 and about 135 degrees. In another embodiment, the angle G1 may be adjusted within a range between about 0 and about 90 degrees. For example, in one embodiment, the movable members 546 may be movable relative to one another to transition the patch panel device 530 between a first condition in which front surfaces 551 of the movable members 546 are substantially coplanar, and adjacent ones of the members 546 are spaced apart a first distance or contact each other, and a second condition in which the front surfaces 551 of respective adjacent members 546 are in different planes in accordance with the angle G1 that one of the adjacent members 546 is pivoted or rotated relative to the other adjacent members 546, where the other member 546 may or may not be at the same position as in the first condition.

As described with respect to the patching system 400 and patch panel devices 430, a plurality of patch panel devices 530 may also be supported within housing 2, and may be translatable into or out from the housing 2 in a direction along axis z. Once spaced apart from the housing 2, the movable member 546 may be pivoted with respect to the securement member 544, thereby spacing the surfaces 549a, 549b of the connector 549 from any adjacent connector 549 such that the cables C3 may be more accessible and readily grasped by a user to detach the cable C from the cable adapter or connector 549 of the movable member 546 (as shown in FIG. 11B).

In other embodiments, as shown in FIGS. 12A-D, connection means of a patch panel device may be shaped or arranged in a number of orientations in a non-expanded state to allow more ports to be coupled to or arranged along the connection means thereof. The connection means in such embodiments may include nonlinear connection means and/or connection means disposed along planes not parallel to the other sides of the patch panel device.

Figure 12A:
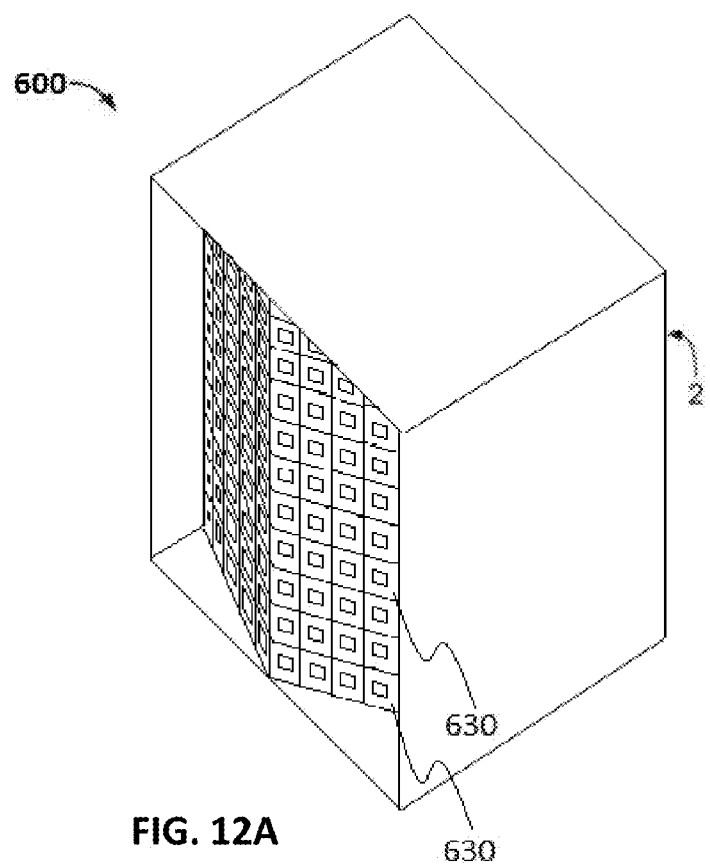
FIG. 12A is a front perspective view of a patch panel system including multiple patch panel devices according to yet another embodiment of the disclosure.
Figure 12B:
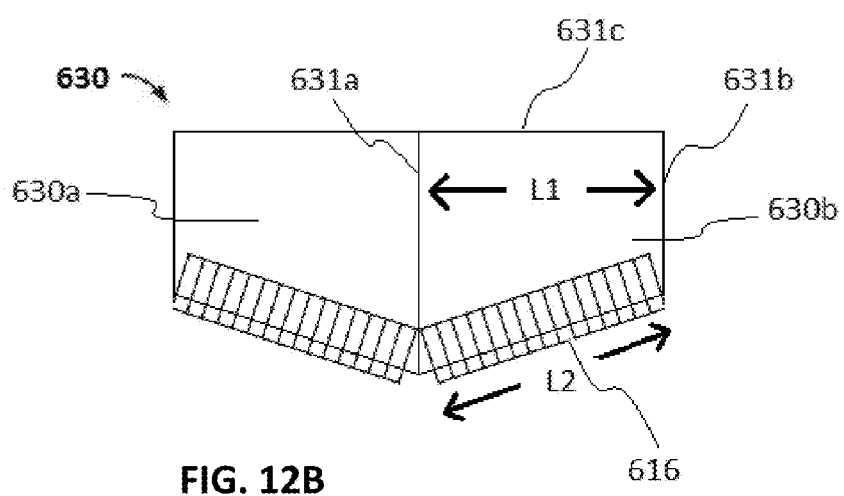
FIG. 12B is a top view of one of the patch panel devices of the patch panel system of FIG. 12A.

Now referring to FIGS. 12A-B, a patch panel system 600 may include a housing 2 similar to other embodiments described herein, and one or more patch panel devices 630 supported therein. Each patch panel device 630 may define a first or medial side 631a, a second or lateral side 631b, and a third or distal side 631c, and may include a connection means 616 generally opposite the distal side 631c. First side 631a and second side 631b may extend substantially parallel to one another and substantially perpendicular to distal side 631c. Distal side 631c and connection means 616 may each extend substantially linearly from the first side 631a to the second side 631b, along intersecting planes. The first side 631a may have a length greater than the length of the second side 631b, to provide that connection means 616 may have a length L2 greater than a length L1 of distal side 631c, where the lengths L1 and L2 extend from the first side 631a to the second side 631b.

Similar to other embodiments described herein, a plurality of patch panel devices 630 may be arranged along the height of the housing 2 and may be translatable proximally from (and distally into) housing 2 to provide better access to the ports. A first group of ports on a first connection means portion may be translatable via a first tray portion 630a and a second group of ports on a second connection means portion may be separately translatable via a second tray portion 630b that is adjacent the first tray portion 630a. The first and second tray portions 630a and 630b may be integrally formed or may alternately be non-integrally formed. If the tray portions 630a and 630b are non-integrally formed, they may be separately translatable or they may alternately be functionally or physically connected such that all of the ports are effectively connected via a single tray. With the exception of the nonlinear arrangement of ports along connection means 616, the ports and connection means illustrated in FIGS. 12A-B may take the form of any other embodiment described herein. For example, the connection means 616 may be expandable as described in connection with FIGS. 2A-B such that a gap space may be introduced or increased between individual ports to provide increased access to the ports. Alternatively, ports may be hingedly coupled to portions of trays 630a and/or 630b such that individual ports may be pivoted toward or away one another to change the spacing between individual ports, similar to the embodiments described in connection with FIGS. 8A-9B. Further, the ports may be rotatable similar to the embodiments described in connection with FIGS. 10A-11D.

Figure 12C:
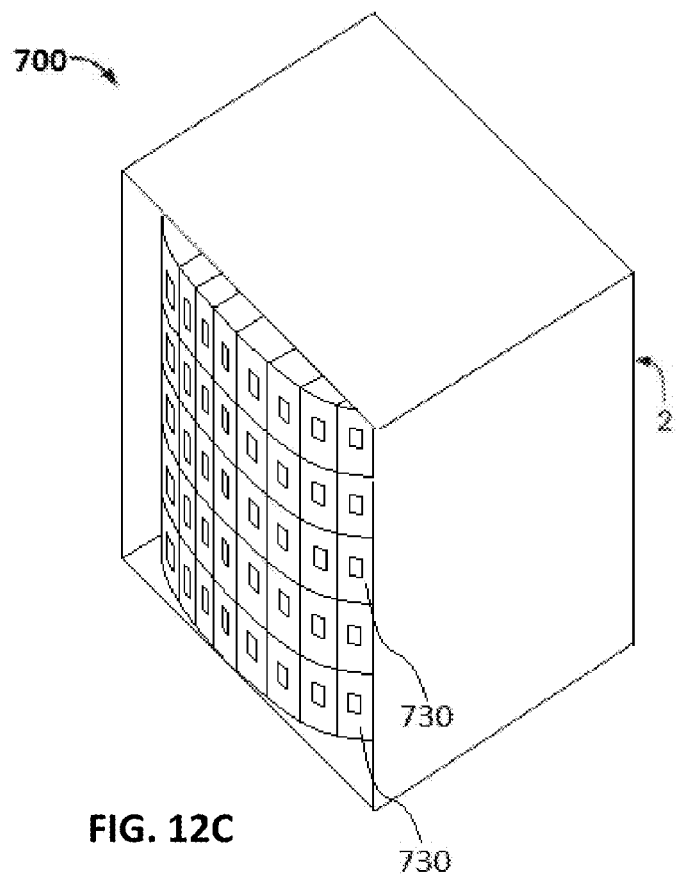
FIG. 12C is a front perspective view of a patch panel system including multiple patch panel devices according to a further embodiment of the disclosure.
Figure 12D:
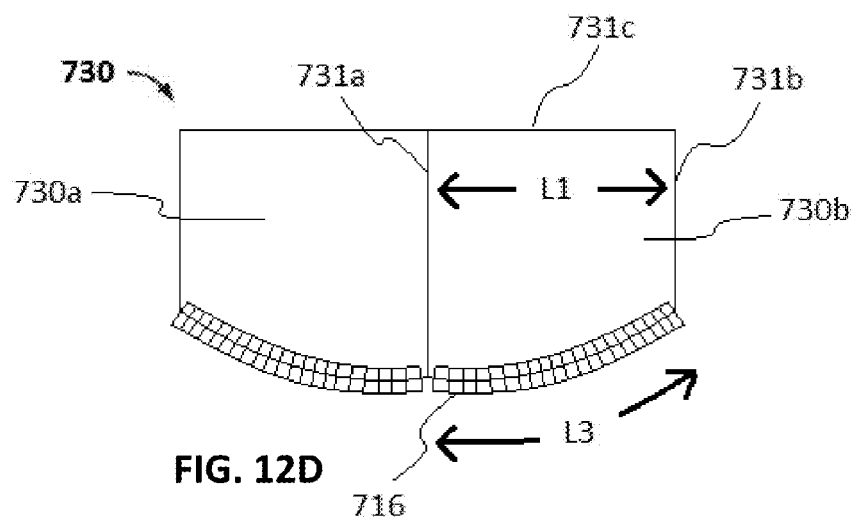
FIG. 12D is a top view of one of the patch panel devices of the patch panel system of FIG. 12C.

Referring to FIGS. 12C-D, a patch panel system 700 may include a housing 2 similar to other embodiments described herein, and one or more patch panel devices 730 supported therein. Patch panel system 700 may be arranged conceptually similarly to patch panel system 600. For example, each patch panel device 730 may define a first or medial side 731*a*, a second or lateral side 731*b*, and a third or distal side 731*c*, and includes a connection means 716 generally opposite the distal side 731*c*. Also similar to patch panel system 600, first side 731*a* and second side 731*b* may extend substantially parallel to one another and substantially perpendicular to distal side 731*c*. However, while distal side 731*c*, having a length L1, extends substantially linearly from the first side 731*a* to the second side 731*b*, the same is not true of connection means 716. Rather, connection means 716 extends arcuately, at least partially, from the first side 731*a* to the second side 731*b* in a manner allowing connection means 716 to have a length L3 that is greater than the length L1 of distal side 731*c*.

Similar to patch panel system 600 and other embodiments described herein, a plurality of patch panel devices 730 may be arranged along height of the housing 2 and may be translatable proximally from housing 2 to provide better access to the ports. A first tray 730*a* may provide translational movement of a first group of ports while a second tray 730*b* may provide translational movement of a second group of ports. Alternately, first tray 730*a* and second tray 730*b* may be formed as a single integral tray or may be functionally connected to operate as a single tray. Also similar to patch panel device 630, patch panel device 730 may include ports and connection means taking any other suitable form described herein.

Now referring to FIGS. 12A-D, even when stored inside of a housing, such as in housing 2, the patch panel devices 630 and 730, particularly the connection means 616 and 716 thereof, may be shaped and arranged in a number of orientations which allow the connection means, in the non-expanded state, to have a length longer than the distance between the parallel first side 631*a*, 731*a* and the second side 631*b*, 731*b* of the patch panel device. As noted above, this configuration allows for an increased number of ports to be coupled to or along the connection means 616, 716. Additionally, it should be understood that the housing 2, particularly its proximal face, may be altered in shape to more closely approximate the shape of the particular patch panel device, and particularly its connection means, to be stored inside.

Figure 13A:
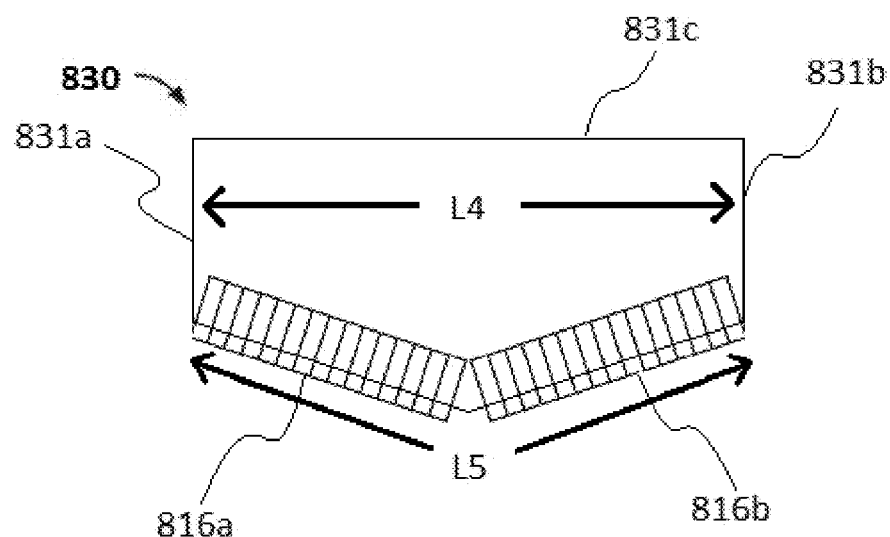
FIG. 13A is a top view of a patch panel device according to another embodiment of the disclosure.

FIG. 13A illustrates a patch panel device 830 identical to patch panel device 630 of FIG. 12B in all respects except that there is a single integral tray. In this embodiment, the patch panel device 830 may have first and second lateral sides 831*a*, 831*b* that are substantially parallel to one another, with a distal side 831*c* having a length L4 that is substantially perpendicular to the lateral sides 831*a*, 831*b*. A first connection means portion 816*a* extends along a proximal side along a first substantially linear path and a second connection means portion 816*b* extends along the proximal side along a second substantially linear path. The first and second substantially linear paths may be nonparallel and have a total length L5 that is greater than the length L4 of distal side 831*c*.

Figure 13B:
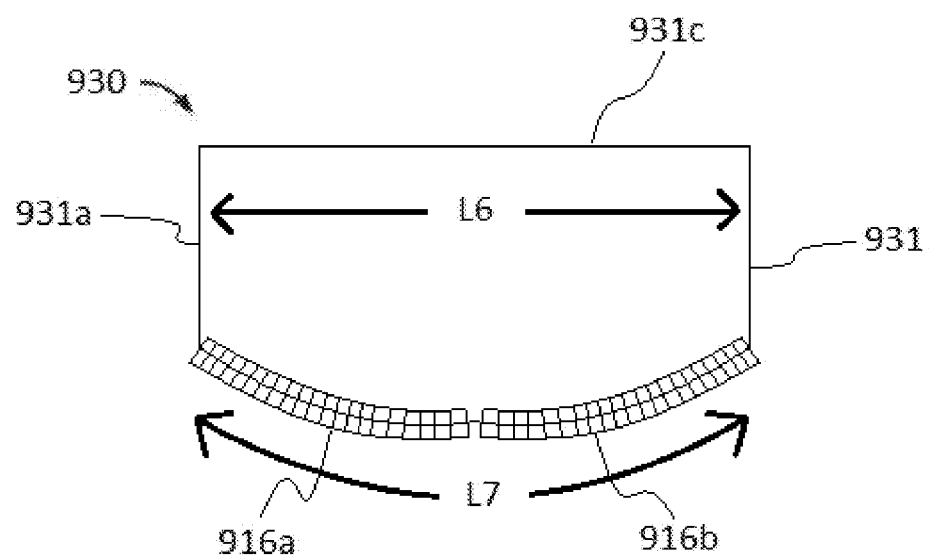
FIG. 13B is a top view of a patch panel device according to still another embodiment of the disclosure.

Similarly, FIG. 13B illustrates a patch panel device 930 identical to patch panel device 730 of FIG. 12D in all respects except that there is a single integral tray. In this embodiment, the patch panel device 930 may have first and second lateral sides 931*a*, 931*b* that are substantially parallel to one another, with a distal side 931*c* having a length L5 that is substantially perpendicular to the lateral sides 931*a*, 931*b*. A first connection means portion 916*a* extends along a proximal side in a first at least partially arcuate path and a second connection means portion 916*b* extends along the proximal side in a second at least partially arcuate path. The first and second at least partially arcuate paths may form a continuous arcuate path or two separate arcuate paths as shown. The first and second at least partially arcuate paths have a total length L6 that is greater than the length L7 of distal side 931*c*.

Figure 14A:
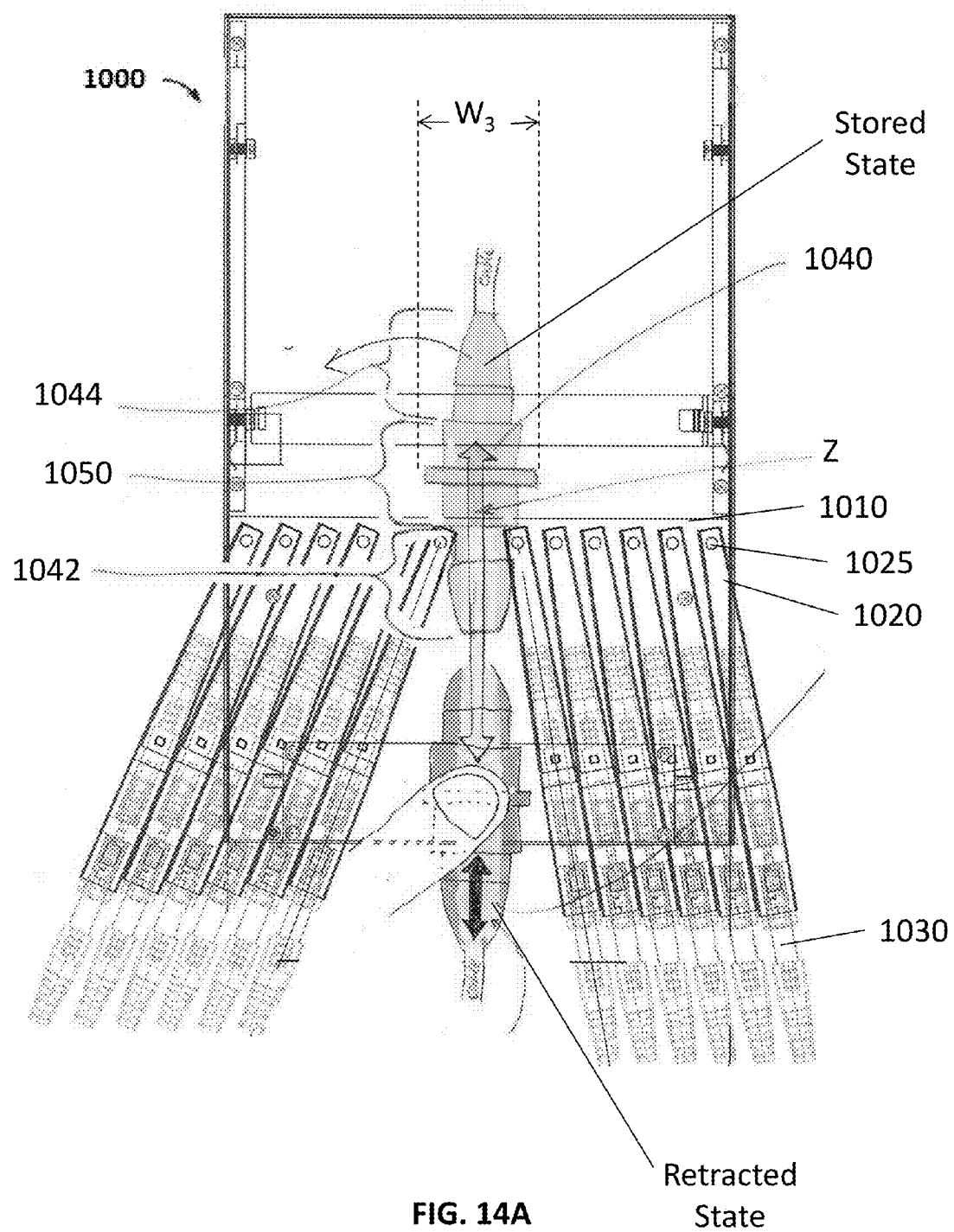
FIG. 14A is a top view of a patch panel device according to yet a further embodiment of the disclosure.

FIG. 14A illustrates a patch panel device 1000 with a plurality of different connector types. Patch panel device 1000 may be substantially similar to patch panel device 300A of FIGS. 8A-B in a number of ways. For example, the patch panel device 1000 may include a tray 1010 and a plurality of arms 1020 that are each operatively coupled in a pivotable relationship with the tray 1010. Each arm 1020 may be operably coupled to a first connector type 1030, such as an LC connector, at a proximal end of the arm 1020. A pin 1025 may pivotably connect the distal end of each arm 1020 to the tray 1010. The tray 1010 may be slidably received within a housing, such that the patch panel device 1000 is translatable in a direction toward or away from the distal end of the housing. Although not illustrated, patch panel device 1000 may include bars, similar to bars 310 of patch panel device 300A, to facilitate the translation of the tray 1010 with respect to the housing. Proximal translation of the tray 1010 may allow each of arms 1020 to pivot, thereby providing the ability to increase the distance between proximal ends of adjacent connectors 1030. Generally, patch panel device 1000 may be transitionable between a first state in which tray 1010 is substantially within the housing and connectors 1030 are generally longitudinally aligned with one another, and a second state in which tray 1010 is substantially pulled out of the housing and connectors 1030 are pivotable away from one another. It should be understood that patch panel device 1000, as well as other patch panel devices described herein, need not necessarily rely on sliding motion of a tray to provide pivoting motion of connectors. For example, patch panel device 1000 need not be contained within a housing that constrains pivoting of connectors 1030. In some embodiments, such as ones similar to those described in U.S. patent application Ser. No. 14/201,010, the disclosure of which is incorporated by reference herein, a patch panel device may include slidable or otherwise moveable or removeable sidewalls that constrain the pivoting motion of connectors in a first state, but allow pivoting motion of the connectors when the sidewalls are in a second state that does not constrain such pivoting motion.

In addition to first connector types 1030, patch panel device 1000 may include one or more second connector types 1040. The second connector type 1040 may be larger in one or more dimensions when compared to first connector type 1030. For example, second connector type may be a multiple-fiber push-on/pull-off ("MPO") connector, which may be wider than an LC connector. When second connector type 1040 is larger in a dimension than first connector type 1030, it may not be possible for all of the connectors 1030, 1040 to be flush with the proximal end of tray 1010 when the tray 1010 is pushed substantially into the housing to obtain a stored state. For example, assume the tray 1010 has a width of thirteen units, there are twelve connectors 1030 of the first type each having a width of one unit, and there is one connector 1040 of the second type having a width of two units. When the tray 1010 is pushed distally into the housing and all of the connectors 1030 move in a direction so as to longitudinally align with one another, the connectors 1030 and 1040 could not all be positioned to be aligned flush at the proximal face or side with one another, as the tray provides 13 units of width but the connectors 1030 and 1040 define a total of 14 units of width. To allow for the use of twelve connectors 1030 and one connector 1040 that has a greater width than the connectors 1030, the connector 1040 may be coupled to tray 1010 with a separate mechanism such that connector 1040 may reside in a distal portion of the tray 1010 compared to first type connectors 1030 when the tray 1010 is in a stored state. The connectors 1030 may move as described above with a pivoting motion that is available once the tray 1010 is pulled proximally out of the housing to transition from a stored state to a retracted state. In one embodiment, connector 1040 may have a separate mechanism such that the connector 1040 may be pulled proximally in direction Z out of the housing (or pushed distally into the housing) once connectors 1030 are positioned outside the housing and pivoted to provide sufficient clearance space for the larger connector 1040 to move proximally and between adjacent connectors 1030.

In particular, second connector 1040 may have a proximal connector portion 1042 and a distal connector portion 1044, and be coupled to tray 1010 by a connector holder 1050. Proximal connector portion 1042 and distal connector portion 1044 may be a male (or female) connector portion and a corresponding female (or male) connector portion, respectively. However, proximal connector portion 1042 and distal connector portion 1044 may be portions of a unitary connector piece. The connector holder 1050 and/or the second connector type 1040 may have a width $W_3$ that is greater than the width of other individual connectors 1030 of the first type. The connector holder 1050 may be slidably coupled to tray 1010, for example, by a track 1016 (see FIG. 14C). The second connector 1040 may be fixedly coupled to the connector holder 1050, such that the second connector 1040 is slidable with the connector holder 1050 in direction along axis Z from a distal stored state to a proximal retracted state.

FIG. 14B illustrates one embodiment of connector holder 1050. Generally, connector holder 1050 may have an inferior portion and a superior portion. The inferior portion may extend from a distal end 1051 to a proximal end 1052. As shown, the inferior portion is in the general shape of rectangular prism with a height $H_2$ and a width $W_4$. The height $H_2$ may be similar or greater than the height of the distal portion of arms 1020 of first connectors 1030 (particularly at a distal end of the arms 1020 if the arms are not of a constant height dimension). The width $W_4$ is preferably similar or smaller than the width of the distal portion of arms 1020 of first connectors 1030. The superior portion may include a connector coupling 1053 positioned on the inferior portion. The connector coupling 1053 may take any shape suitable for coupling to second connector 1040. It should be understood that a connector adapter or other component may fit inside or connect to the connector coupling 1053, and one or more portions of the connector (e.g. proximal connector portion 1042 and distal connector portion 1044) may be coupled to the adapter. In this embodiment, connector 1040 may not be directly in contact with the connector coupling 1053, but rather connector 1040 may be coupled to the connector coupling 1053 via an intermediary component. Generally, connector coupling 1053 may take the general shape of a rectangular prism with a hollowed center portion 1054 into which second connector 1040 may be friction or snap fitted (with or without an intermediary adapter). The proximal end 1052 of the inferior portion may include a tab 1055 or other textured surface to facilitate a user in manipulating the connector holder 1050.

Although a variety of sliding mechanisms may be utilized to create a sliding relationship between connector holder 1050 and tray 1010, the illustrated embodiment includes a dovetail coupling to facilitate such sliding. In particular, as best illustrated in FIG. 14C, the distal end 1051 of the inferior portion may include a dovetail recess 1056 extending along a bottom surface. The dovetail recess 1056 may extend any desired length along the inferior surface of connector holder 1050, depending on the distance desired for the sliding motion. The tray 1010 may include a track 1016 in the form of a dovetail protrusion that slidingly mates with the dovetail recess 1056. The track 1016 may be a separate structure bolted onto the tray 1010, for example with screws 1018. Alternately, the track 1016 may be integrally formed with tray 1010 (connection to tray 1010 not illustrated in FIG. 14C). If the track 1016 is a separate structure, the track 1016 may be pivotably connected to the tray 1010, for example by a pin similar to the pins 1025. With such a pivotable connection, second connector 1040 and connector holder 1050 may both be pivotable with respect to the tray 1010, similar to the arms 1020. Without the second connector 1040 having the capability of such pivotable motion, the range of pivotable motion of the arms 1020 may be reduced as the second connector 1040 and connector holder 1050 may otherwise interfere with the swinging of arms 1020. The terminal portion of distal end 1051 may include a stopper 1057, such as a pin extending into the dovetail recess 1056, to limit the amount of proximal sliding motion possible by connector holder 1050.

The proximal end 1052 is illustrated in FIG. 14B as including a tab 1055, but other configurations may be suitable. For example, FIG. 14D illustrates a first alternate embodiment in which the proximal end 1052 of connector holder 1050 may have a lip 1055' that extends to a height similar or greater than the height of a proximal port of the connector 1040. This lip 1055' effectively may act as a cover for the port. For example, when the tray 1010 is positioned substantially within the housing and connectors 1030 are aligned, the proximal end of connectors 1030 would be generally flush with the front of the housing. However, a gap may exist between the two first type connectors 1030 that are adjacent the second type connector 1040, as the second connector 1040 is positioned distally with respect to the first type connectors 1030 in this position. As such, lip 1055' may extend upwards to provide a covering in line with the gap. As shown in FIG. 14E, in the embodiment with an extended lip 1055', an aperture 1057 may be included at a superior portion of the lip 1055' such that a cable attached to connector 1040 may by retained within aperture 1057. Although not shown, multiple apertures 1057 may be included so as to retain multiple cables, respectively, that may extend from connector 1040.

Figure 14F:
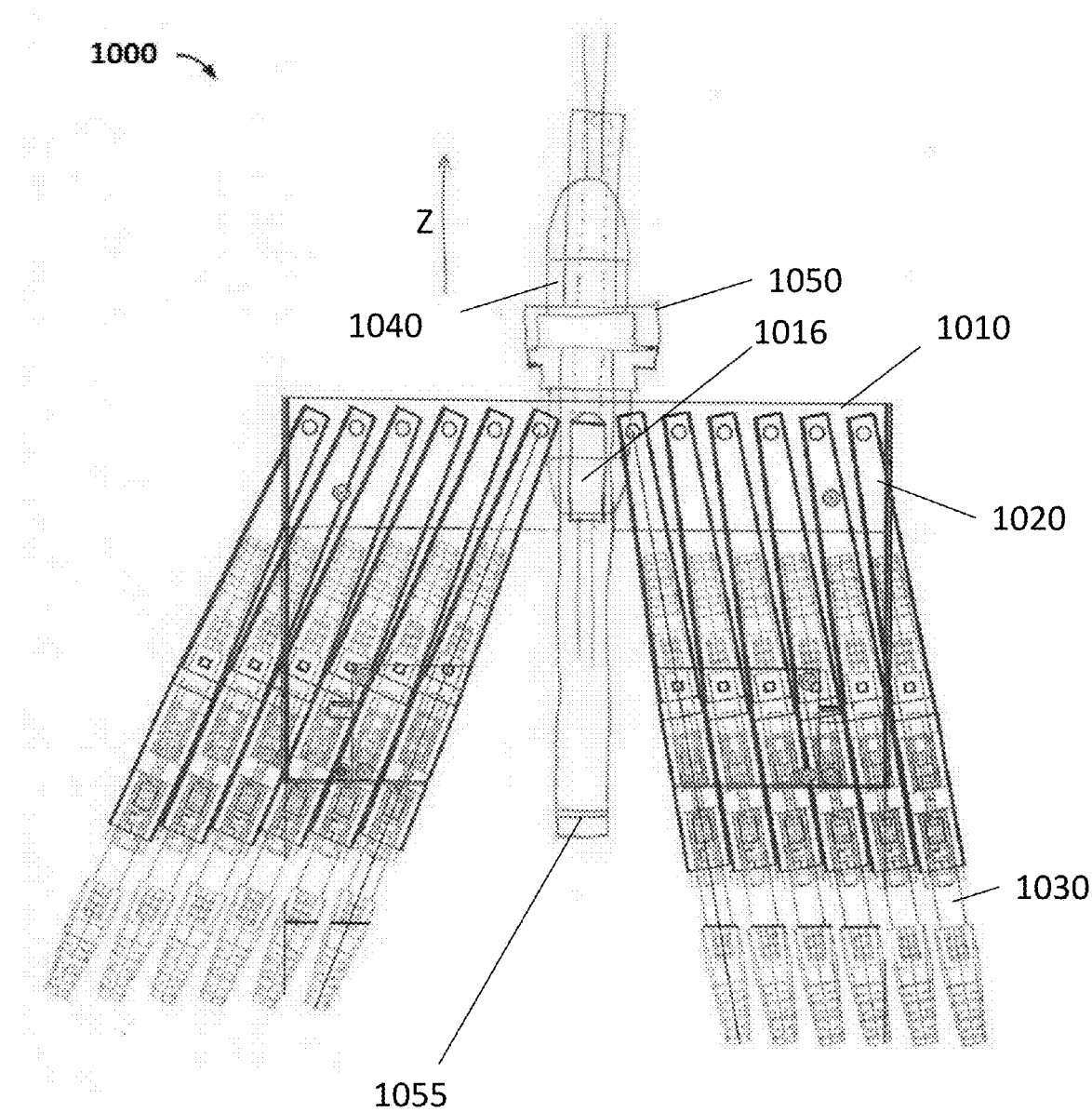
FIG. 14F is a top view of the patch panel device of FIG. 14A in a stored state.

FIG. 14F illustrates patch panel device 1000 after second connector 1040 is pushed distally along axis Z along track 1016 to obtain a stored state therefor. When in the stored state, the arms 1020 of connectors 1030 may be pivoted such that they are all longitudinally aligned with another, allowing tray 1010 to be pushed distally into the housing for storage. The longitudinally aligned positioning of the connectors 1030 may be obtained because the larger second connector 1040 may be positioned in otherwise unused space at the distal portion of the tray 1010 because the larger dimension of connector 1040 does not interfere with the movement of arms 1020 of connectors 1030. If connector 1040 were not pushed distally prior to attempting to push tray 1010 distally into the housing to obtain a stored state for the tray, as the arms 1020 of connectors 1030 rotated to obtain longitudinal alignment with one another, the larger connector 1040 would interfere so as not to permit such longitudinal alignment of the connectors 1030. It should be noted that although connector 1040 is illustrated in the stored state, the tray 1010 is still pulled out of the housing in the illustration.

Figure 14G:
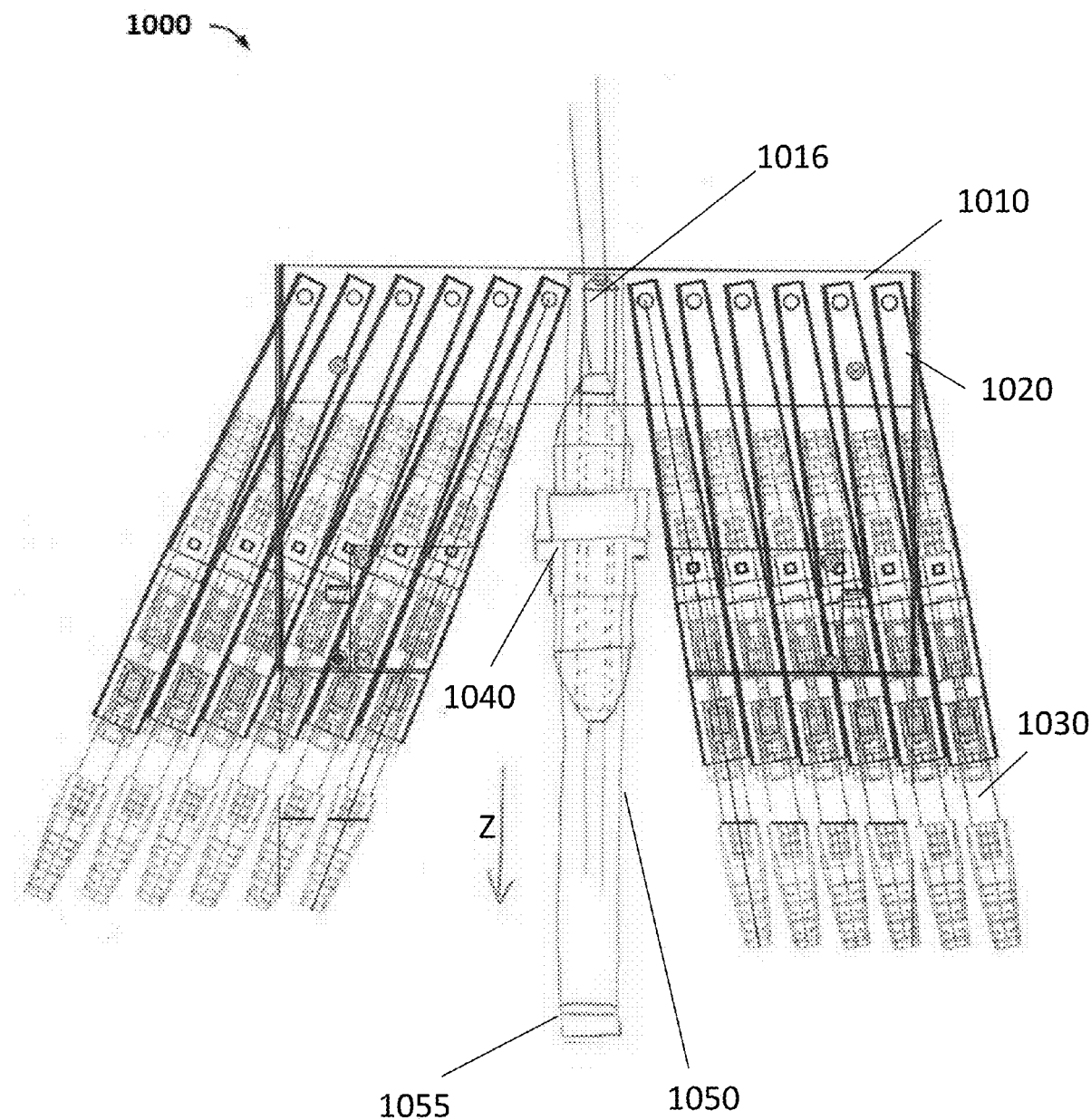
FIG. 14G is a top view of the patch panel device of FIG. 14A in a retracted state.

FIG. 14G illustrates patch panel device 1000 after second connector 1040 is pulled proximally along axis Z along track 1016 to obtain a retracted state. When in the retracted state, second connector 1040 is in a more accessible position for connecting cables to, or otherwise manipulating, second connector 1040 than when the connector 1040 is in the stored state. Because the width $W_4$ of the inferior portion of connector holder 1050 is generally as wide (or less wide) than the space between adjacent arms 1020 of first type connectors 1030 when the adjacent arms 1020 are longitudinally aligned or pivotably moved in a direction away from each from the longitudinally aligned position, the connector holder 1050 is slidable between the stored and retracted positions without being obstructed by the adjacent arms 1020. The arms 1020 and/or connectors 1030 are substantially longitudinally aligned when the arms 1020 and/or connectors 1030 are substantially parallel to one another. When two arms 1020 and/or connectors 1030 are pivoted away from one another, the position of the arms 1020 and/or connectors 1030 is referred to as being pivoted away. Because the height $H_2$ of the inferior portion of connector holder 1050 is as high (or higher) than the height of the arms 1020 of the adjacent first type connectors 1030, the portion of connector holder 1050 and/or second connector 1040 that is greater in at least one dimension than the space between adjacent arms 1020 (when the arms 1020 are either longitudinally aligned or pivoted away from one another) does not interfere with the adjacent arms 1020. In other words, the portion of connector holder 1050 and/or connector 1040 that has a greater dimension than the space between adjacent arms 1020 moves in a different plane than the plane in which arms 1020 are located. For example, each arm 1020 of each first connector 1030 may be pivotable within a first plane. The inferior portion 1051 of connector holder 1050 may be slidable in the same first plane, while the superior portion 1052 of the connector holder 1050 is slidable in a second plane that is parallel but vertically offset from the first plane. In some embodiments, connector holder 1050 and track 1016 may interact such that connector holder 1050 does not slide fully within a plane parallel to the tray 1010, for example if connector holder 1050 has a vertical transition or moves along an inclined or declined path. In these embodiments, the superior portion 1052 of the connector holder 1050 may, at certain points, slide in the same plane as the plane in which connectors 1030 pivot. However, at least at the point which the superior portion of connector holder 1050 is laterally aligned with the distal ends of arms 1020, the superior portion of connector holder 1050 may be slidable in a different plane than the plane in which the connectors 1030 pivot.

In the description connected with FIGS. 14A-F, the second connector type is described as being an MPO connector. The MPO connector may carry a larger number of fibers than an LC connector. For example, the MPO connector may carry 12 fibers, 24 fibers, or more. The use of the MPO connector in a system of LC connectors may allow a greater density of fibers for a particular patch panel device. However, because MPO connectors may be larger in dimensions than LC connectors, it may not be possible to simply replace one LC connector with an MPO connector. The above described patch panel system 1000 is one possible solution. However, it should be understood that the concepts described are not limited to LC connectors and MPO connectors. For example, the same problem may arise with any first connector type that is a different dimension than a second connector type. Regardless of the particular type of connectors, the concepts of the above described patch panel device 1000 may be applied to permit housing of different types of connectors that might otherwise be difficult to house within a single patch panel device. In addition, although a single second type connector 1040 is illustrated as being positioned near the center of tray 1010, it should be understood that the second connector 1040 may be positioned anywhere along tray 1010. Similarly, more than one second type connectors 1040 may be positioned on tray 1010.

Figure 15:
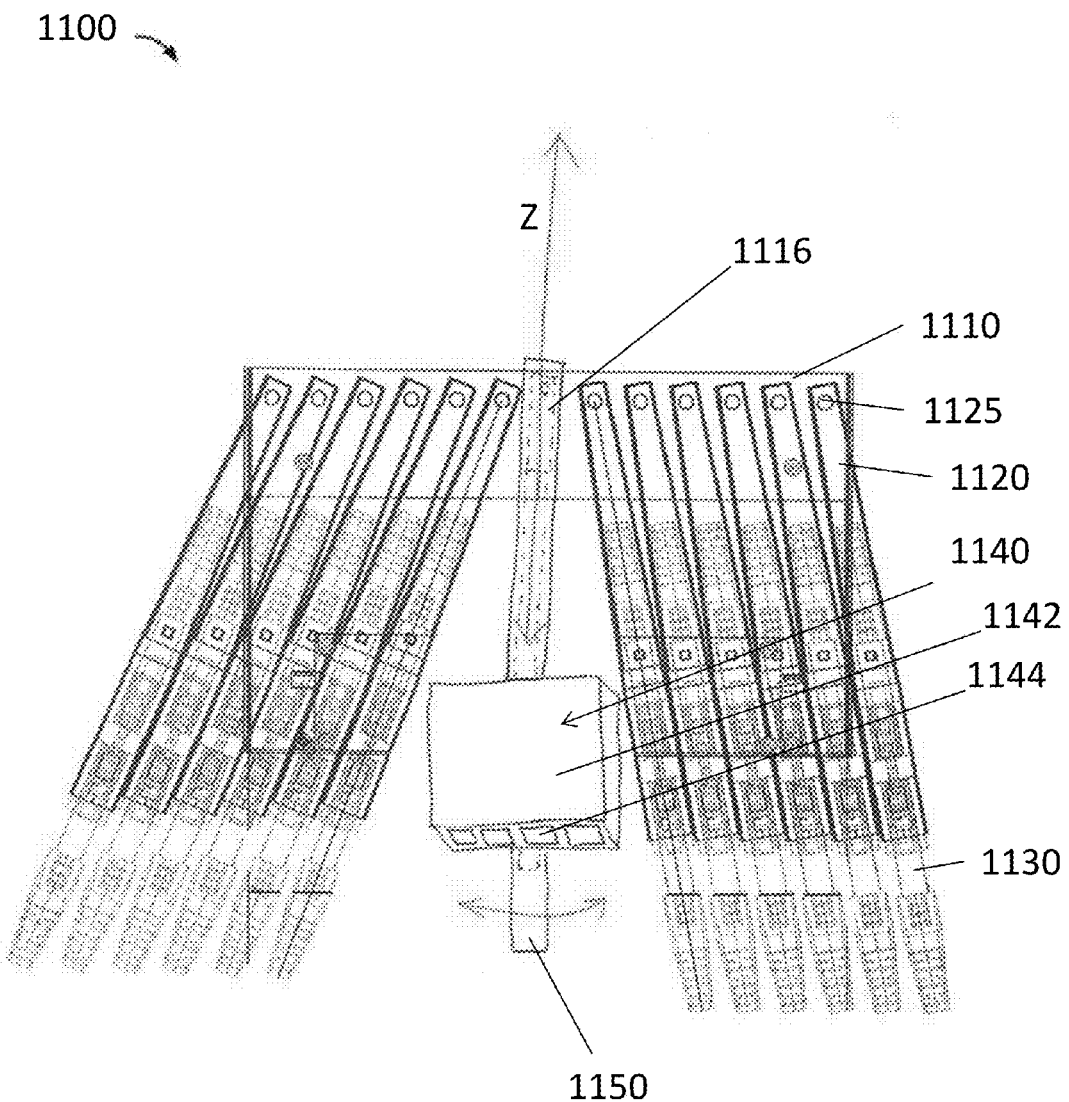
FIG. 15 is a top view of a patch panel device according to still a further embodiment of the disclosure.

FIG. 15 illustrates a patch panel device 1100 with a plurality of different connector types. Patch panel device 1100 may be substantially identical to patch panel device 1000 described above in connection with FIGS. 14A-G, with the exception that a multi-port adapter 1140 is included rather than an MPO connector 1040. For example, the patch panel device 1100 may include a tray 1110 and a plurality of arms 1120 each operatively coupled in a pivotable relationship with the tray 1110, for example by pins 1125. Each arm 1120 may be operably coupled to a first connector type 1130, such as an LC connector, at a proximal end of the arm 1120. Multi-port connector 1140 may have a body 1142 that is larger in one or more dimensions, such as the width, when compared to first connector type 1130, and may have a plurality of ports 1144 within the body to receive cables.

Connector 1140 may be capable of similar movement as connector 1040, albeit the structure allowing such movement may be different between patch panel devices 1000 and 1100. For example, connector 1140 may be pulled proximally in direction Z out of the housing into a retracted state, as shown in FIG. 15, or pushed distally into the housing into a stored state (not illustrated), once connectors 1130 are positioned outside the housing and pivoted to provide sufficient clearance space for the larger connector 1140 to move between adjacent connectors 1130. Second connector 1140 may be coupled to tray 1110 by a connector holder 1150, which may be similar or identical to connector holder 1050. For example, connector holder 1150 may be slidably and pivotably coupled to tray 1110 by a track 1116. The second connector 1140 may be fixedly coupled to the connector holder 1150 by any suitable means.

Figure 16A:
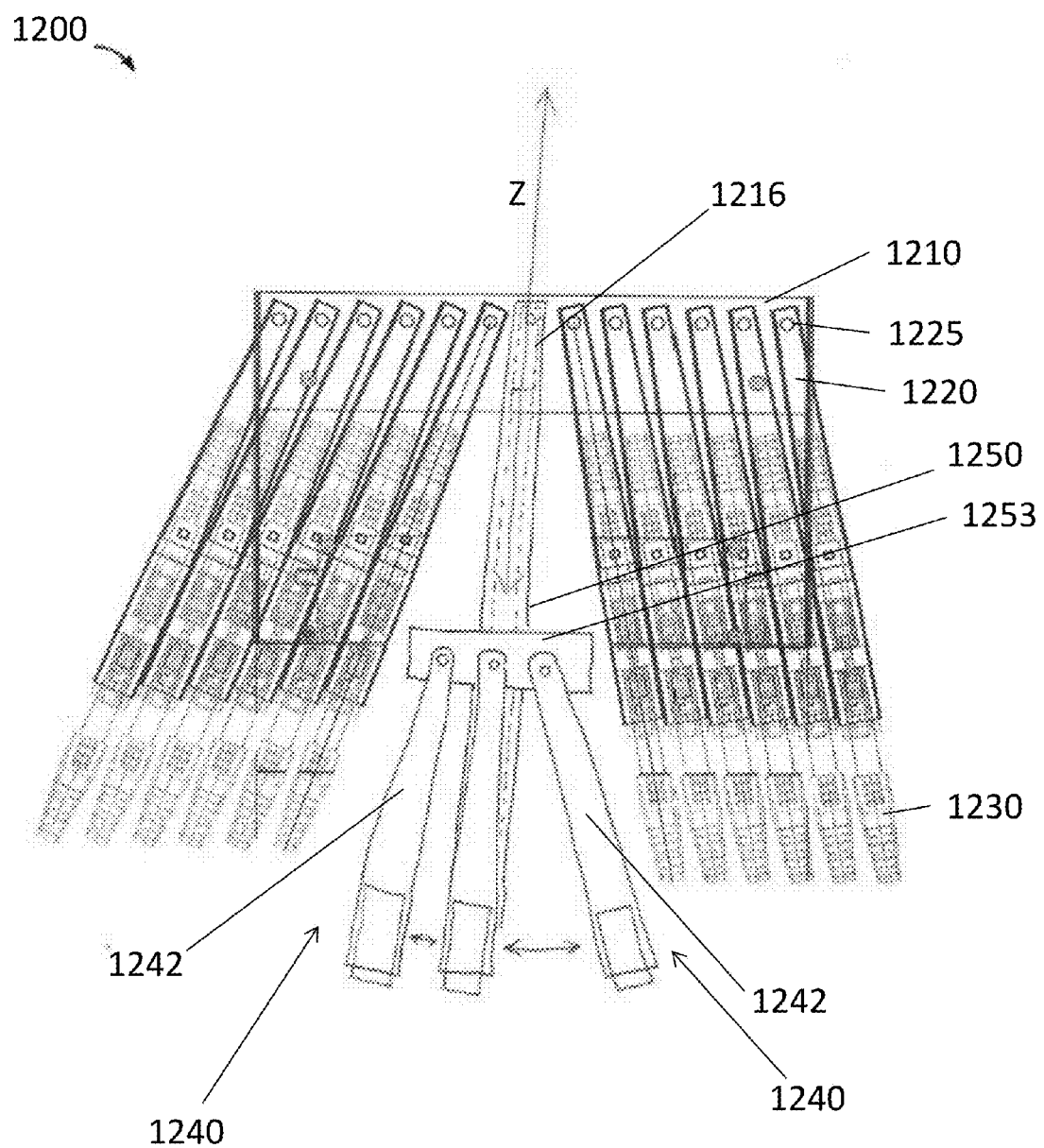
FIG. 16A is a top view of a patch panel device according to yet another embodiment of the disclosure.
Figure 16B:
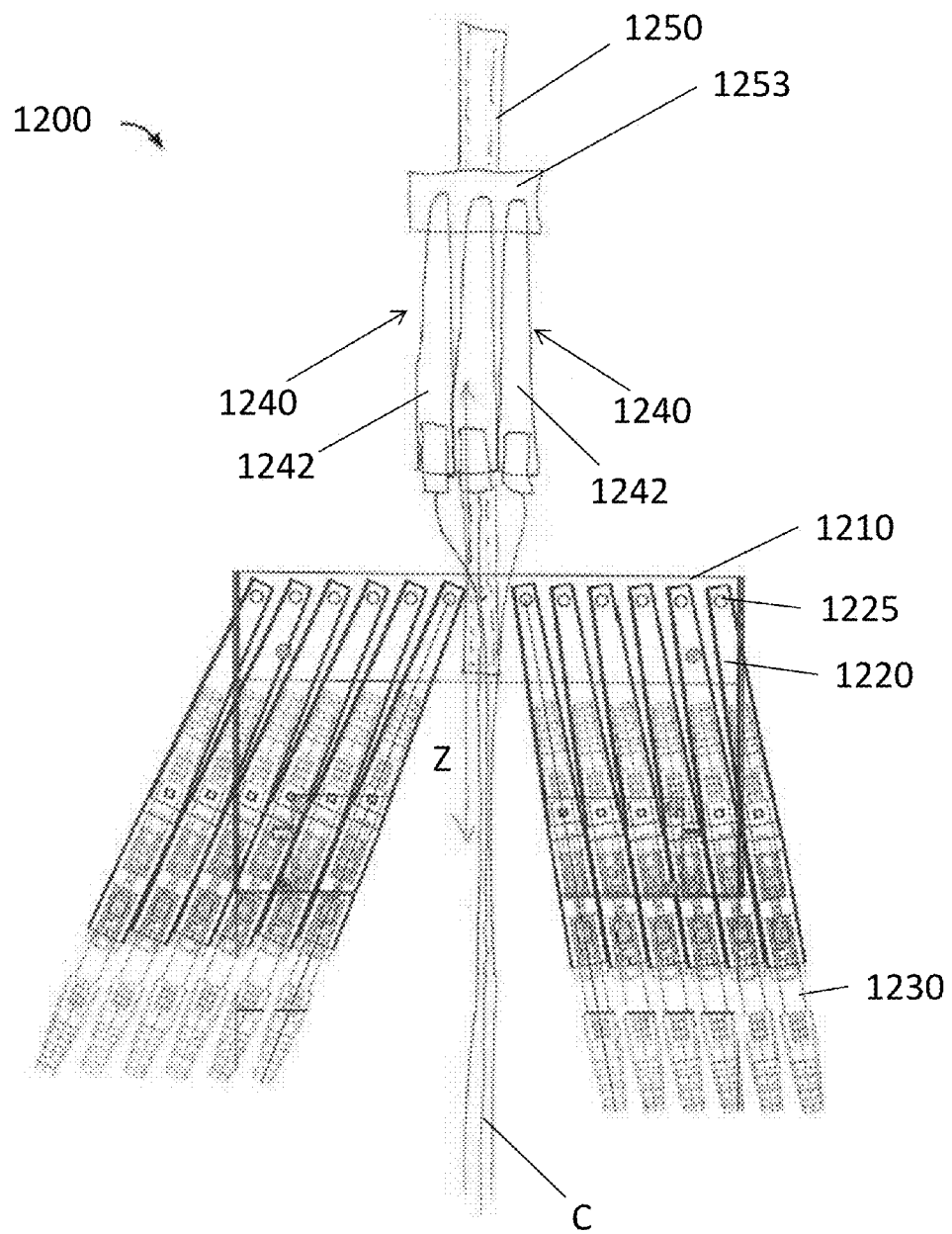
FIG. 16B is a top view of the patch panel device of FIG. 16A with a second connector thereof in a stored state.

FIGS. 16A-B illustrate a patch panel device 1200 with a plurality connectors. Patch panel device 1200 may be substantially identical to patch panel devices 1000 and 1100, with the exception that a plurality of second connectors 1240 are included rather than a single MPO connector 1040 or a single multi-port adapter 1140 as illustrated in FIGS. 14A-15A. For example, the patch panel device 1200 may include a tray 1210 and a plurality of arms 1220 each operatively coupled in a pivotable relationship with the tray 1210, for example by pins 1225. Each arm 1220 may be operably coupled to a first connector 1230, such as an LC connector, at a proximal end of the arm 1220. One or more second connectors 1240 may be coupled to a connector holder 1250, which itself may be slidably and/or pivotably coupled to tray 1210, for example by track 1216.

Connector holder 1250 may be substantially identical to connector holders 1050 and/or 1150, and may include a coupling portion 1253 to which second connectors 1240 are coupled. Although three second connectors 1240 are illustrated in patch panel device 1200, it should be understood that more or fewer second connectors 1240 may be used. In the illustrated embodiment, each connector 1240 is similar in form as first connectors 1230. For example, each second connector 1240 generally may include an arm 1242 with a proximal end configured to receive a wire or a cable C, and a distal end. However, rather than being coupled directly to tray 1210, the distal end of arm 1242 is coupled to the coupling portion 1253 of connector holder 1250, with or without a pivoting relationship between each arm 1242 and the coupling portion 1253.

Connectors 1240 may be capable of similar movement as connector 1040, with the addition that each individual connector 1240 may be pivotable with respect to the connector holder 1250. It should be understood that some structural difference between connector holder 1250 and connector holders 1050 and 1150 may be provided without deviating from the scope of the disclosure. However, the general functionality may be similar between patch panel devices 1200, 1100, and 1000. For example, connectors 1240 may be pulled proximally in direction Z out of the housing into a retracted state, as shown in FIG. 16A, or pushed distally into the housing into a stored state, as shown in FIG. 16B, once connectors 1230 are positioned outside the housing and pivoted to provide sufficient clearance space for the connectors 1240 to move between adjacent connectors 1230. The second connectors 1240 may have an aggregate width, and the coupling portion 1253 may have a width, greater than the width of an individual connector 1230. It should be noted that second connectors 1240 may be any type of suitable connector, including MPO connectors, multi-port connectors, or LC connectors.

In any of the embodiments described herein, it is to be understood that any suitable connector may be used. For example, an LC type connector may be used. However, an LC connector is only one example of a small form connector that may be used. Differently sized connectors, whether larger or smaller may be used. As discussed above, connectors may be configured to be coupled to one or more cables, e.g., simplex or duplex. Specific connectors shown and described herein are merely illustrative embodiments. Connectors that are differently configured and/or sized may be utilized without deviating from the scope and spirit of the present invention.

Although the invention herein has been described with reference to particular embodiments, it is to be understood that these embodiments are merely illustrative of the principles and applications of the present invention. It is to be understood unless otherwise indicated herein that the figures are not intended to be to scale. It is therefore to be understood that numerous modifications may be made to the illustrative embodiments and that other arrangements may be devised without departing from the spirit and scope of the present invention as defined by the appended claims. Such modifications may include the combination of elements of one described embodiment with elements of another described embodiment.

The invention claimed is:

1. A communication patch panel system comprising:
a tray;
a plurality of first connectors, the first connectors each coupled to an arm, each arm having a distal end pivotably coupled to the tray;
a track coupled to the tray;
a connector holder slidably coupled to the track; and
at least one second connector coupled to the connector holder,
wherein the at least one second connector has a stored state and a retracted state and is positioned at least partially distal to the distal ends of the arms when in the stored state.

2. The system of claim 1, wherein the track is pivotably coupled to the tray.

3. The system of claim 1, wherein the connector holder has an inferior portion and a superior portion, the inferior portion having a height that is equal to or greater than a height of the distal ends of the arms.

4. The system of claim 1, wherein the arms of the first connectors are pivotable in a first plane and the connector holder has an inferior portion and a superior portion, the inferior portion slidable in the first plane and the superior portion slidable in a second plane, the second plane being parallel to and vertically offset from the first plane.

5. The system of claim 1, wherein the at least one second connector has a dimension that is greater than a dimension of each first connector.

6. The system of claim 5, wherein the at least one second connector is a different type of connector than at least one of the plurality of first connectors.

7. The system of claim 5, wherein the at least one second connector is an MPO connector.

8. The system of claim 5, wherein the at least one second connector is a multi-port connector.

9. The system of claim 1, wherein the at least one second connector comprises a plurality of second connectors having an aggregate width, the aggregate width of the plurality of second connectors being greater than a width of each of the plurality of first connectors.

10. The system of claim 9, wherein each of the plurality of second connectors is pivotably coupled to the connector holder.

11. The system of claim 9, wherein at least one of the plurality of second connectors is a different type of connector than at least one of the plurality of first connectors.

12. The system of claim 9, wherein at least one of the plurality of second connectors is a same type of connector as at least one of the plurality of first connectors.

13. The system of claim 1, wherein the connector holder has a lip at a proximal end thereof.

14. The system of claim 13, wherein the lip defines at least one aperture configured to guide a cable therethrough.

15. A communication patch panel system comprising:
a tray;
a plurality of connectors of a first type, the first type connectors each coupled to an arm, each arm having a distal end pivotably coupled to the tray;
a track on the tray;
a connector holder slidably coupled to the track; and
a connector of a second type coupled to the connector holder,
wherein the second type connector has a dimension that is greater than a dimension of each first type connector.

16. The system of claim 15, wherein the first connector type is an LC connector and the second connector type is an MPO connector or a multi-port connector.

17. The system of claim 15, wherein the connector holder has an inferior portion and a superior portion, the inferior portion having a height that is equal to or greater than a height of the distal ends of the arms.

18. The system of claim 15, wherein the second connector type and connector holder have a stored state and a retracted state, the tray being slidable distally into the housing when the second connector and connector holder are in the stored state.

19. The system of claim 18, wherein, when in the stored state, the second connector is positioned at least partially distal to the distal ends of the arms.

20. The system of claim 15, wherein the track is pivotably coupled to the tray.

* * * * *